(12) United States Patent
O'Neill, Jr. et al.

(10) Patent No.: US 6,724,373 B1
(45) Date of Patent: Apr. 20, 2004

(54) ELECTRONIC WHITEBOARD HOT ZONES FOR CONTROLLING LOCAL AND REMOTE PERSONAL COMPUTER FUNCTIONS

(75) Inventors: Kevin J. O'Neill, Jr., Collierville, TN (US); John G. Schuman, Cordova, TN (US)

(73) Assignee: Brother International Corporation, Bridgewater, NJ (US)

( * ) Notice: Subject to any disclaimer, the term of this patent is extended or adjusted under 35 U.S.C. 154(b) by 0 days.

(21) Appl. No.: 09/477,825

(22) Filed: Jan. 5, 2000

(51) Int. Cl.[7] .............................. G09G 5/00; G06F 15/16
(52) U.S. Cl. ....................... 345/179; 345/156; 345/733; 345/740; 709/208; 709/204
(58) Field of Search .................................. 709/204, 205, 709/203, 208, 248; 345/619, 650, 661, 665, 666, 701, 733, 751, 156, 179, 965, 966, 967, 961, 740; 434/410

(56) References Cited

U.S. PATENT DOCUMENTS

| | | | |
|---|---|---|---|
| 5,404,458 A | * | 4/1995 | Zetts ............................. 710/73 |
| 5,790,116 A | | 8/1998 | Malone et al. |
| 6,018,346 A | * | 1/2000 | Moran et al. ................ 345/358 |
| 6,144,991 A | * | 11/2000 | England ....................... 709/205 |

FOREIGN PATENT DOCUMENTS

JP 11-226693 8/1999

OTHER PUBLICATIONS

BrightBoard: A Video–Augmented Environment, Stafford–Fraser, Q.; Robinson, P., Conference on Human Factors and Computing Systems, 1996, Vancouver, British Columbia, Canada, ACM Publisher ISBN: 0–89791–774, 1996, pp. 134–141.*

LiveBoard: A large Interactive Display supporting group meetings, presentation and remote collaboration, Elrod, et. al., Conference proceeding on Human Factors in computing systems, 1992, ACM Publisher ISBN: 0–89791–513–5, pp. 599–607.*

Dolphin: Integrated Meeting Support across Local and Remote Desktop Environments and LiveBoards, Streiz, et. al., Proceedings of the conference on Computer supported cooperative work, Chapel Hill, NC, 1994, ACM Publisher ISBN: 0–8979689–1, pp. 345–358.*

(List continued on next page.)

*Primary Examiner*—Jack B. Harvey
*Assistant Examiner*—Beatriz Prieto
(74) *Attorney, Agent, or Firm*—Oliff & Berridge, PLC

(57) ABSTRACT

The invention concerns a method and apparatus that provides predetermined and user determined areas on an electronic whiteboard which provides the user with various computer-related functions. In particular, a communication server would monitor the hot zones for detection of the users electronic pen. If the communication server detects the users electronic pen in the hot zone area for longer than a predetermined time, for example two seconds, then the communication server would perform the function defined by that particular hot zone. A plurality of hot zones may be defined and fixed as part of either the electronic whiteboard environment, or they may be relative so that a user can define particular hot zone areas, including their location, content and function. These hot zone areas may be moved anywhere in the electronic whiteboard area. The user is required to calibrate, or align the area of the electronic whiteboard in which they wish to define the hot zone, and the communication server will then monitor that area for pen activity. Furthermore, the hot zones may be configured so that the user of the electronic whiteboard may selectively send board images to remote users along with e-mail messages, tasking lists, calendars or scheduling information concerning future meetings, etc.

26 Claims, 19 Drawing Sheets

OTHER PUBLICATIONS

Christopher Yates, "mimio: A whiteboard without the board", *PCWEEK*, Jun. 28, 1999.

"Attach mimio to your whiteboard and capture your notes right to your PC!", Virtual Ink "mimio" brochure, Jun. 1999.

"In the time it takes you to read this, you can turn your whiteboard into an electronic whiteboard.", Virtual Ink "mimio" brochure, Oct. 1999.

"Version 1.1 Productivity enhancements", Virtual Ink "mimio" brochure, Jan. 1999.

Japanese–language "mimio" brochure, believed to be from 1999.

* cited by examiner

RELATIONSHIP BETWEEN PEN CHARACTERISTIC AND MODULATION FREQUENCY fm

| fm (kHz) | 10 | 8.7 | 7.7 | 6.9 | 6.3 | 5.6 | 5.0 | 4.5 | 4.1 |
|---|---|---|---|---|---|---|---|---|---|
| PEN CHARACTER-ISTICS | ERASER | THIN/RED | THICK/RED | THIN/GREEN | THICK/GREEN | THIN/BLUE | THICK/BLUE | THIN/BLACK | THICK/BLACK |
| NUMBER OF DEMODULATION COUNTS | 100 | 115 | 130 | 145 | 160 | 180 | 200 | 220 | 245 |

Distribution Hot Zone: X1=2, Y1=2, X2=20, Y2=6
Distribution Hot Zone: X1=2, Y2=6, X2=20, Y2=10
Distribution Hot Zone: X1=2, Y2=10, X2=20, Y2=14
Distribution Hot Zone: X1=2, Y2=14, Y2=20, Y2=18
Distribution Hot Zone: X1=2, Y2=18, Y2=20, Y2=22

TempInfo={ABS/REL, TempMax_Width, TempMax_Height, TempCA_Width, TempCA_Height, TempCA_Off_X, TempCA_Off_Y}

ELECTRONIC WHITEBOARD HOT ZONES FOR CONTROLLING LOCAL AND REMOTE PERSONAL COMPUTER FUNCTIONS

BACKGROUND OF THE INVENTION

1. Field of Invention

The invention relates to communications between an electronic whiteboard and other electronic devices either locally, or though a network, including personal computers, servers, etc.

2. Description of Related Art

There are known devices which link an electronic whiteboard (or "blackboard") with personal computers (PCs) and other devices through networks, such as the Internet. One such product is Virtual Ink Corp.'s Mimio™ system. The Mimio™ system uses a capture bar that attaches to an existing whiteboard and plugs into a PC. The capture bar is a line-of-sight system in that the tip of the marker must be seen by the capture bar in order for data to be recorded. As data is entered onto the whiteboard, the Mimio™ system uses vector-based stroke recording to create a "movie" of the work for the PC.

Standard dry-erase markers are used but they must be installed in a special housing. The housing relays location information back to the data port. The user must press the pen against the board to cause a slight sound to be emitted, which is used by the data port for tracking. Infrared (IR) sensors are used for pen identification. Four pen holders representing four different colors, are used.

Once the "movie" data that has been captured by the Mimio™ system, it can be saved in a Mimio™ file or exported as an HTML file for transfer to another PC via an intranet or the Internet.

However, the Mimio™ system only records a "movie" of the user's keystrokes. No direct functional link is provided to other PC's directly from the board. Since the board is not connected to the computer, the direction of transfer of any information or the operation of any PC function must come from the PC, or from buttons fixed on the capture bar which is directly and connected to the PC.

SUMMARY OF THE INVENTION

The invention concerns a method and apparatus that provides predetermined and user determined areas on an electronic whiteboard which provides the user with various computer-related functions. In particular, a communication server would monitor the hot zones for detection of the users electronic pen. If the communication server detects the users electronic pen in the hot zone area for longer than a predetermined time, for example two seconds, then the communication server would perform the function defined by that particular hot zone.

A plurality of hot zones may be defined and fixed as part of either the electronic whiteboard environment, or they may be relative so that a user can define particular hot zone areas, including their location, content and function. These hot zone areas may be moved anywhere in the electronic whiteboard area. The user is required to calibrate, or align the area of the electronic whiteboard in which they wish to define the hot zone, and the communication server will then monitor that area for pen activity.

Furthermore, the hot zones may be configured so that the user of the electronic whiteboard may selectively send board images to remote users along with e-mail messages, tasking lists, calendars or scheduling information concerning future meetings, etc.

BRIEF DESCRIPTION OF THE DRAWINGS

The preferred embodiments of the invention will be described in detail with reference to the following figures wherein.

DETAILED DESCRIPTION OF PREFERRED EMBODIMENTS

The preferred embodiments of the invention will be described in detail with reference to the figures.

The following explains the principles of the communication method and apparatus related to this invention and the environment in which the invention is able to operate. In these exemplary drawings, as an example of a coordinate reading device related to this invention, a so-called electronic whiteboard, or blackboard is used which electrically reads handwritten characters, drawings, and the like drawn on a coordinate input sheet. As an example of a communication method related to this invention, a communication method is explained in which communication is performed between a pen and a writing panel provided on an electronic whiteboard. Furthermore, an example is explained in which frequency modulation, which is a type of angle modulation, is used. Finally, using these principles, a description will be given of hot zones defined on the electronic whiteboard that are configured to trigger actions by a local PC or a remote PC, through a communication server.

Figure 1:
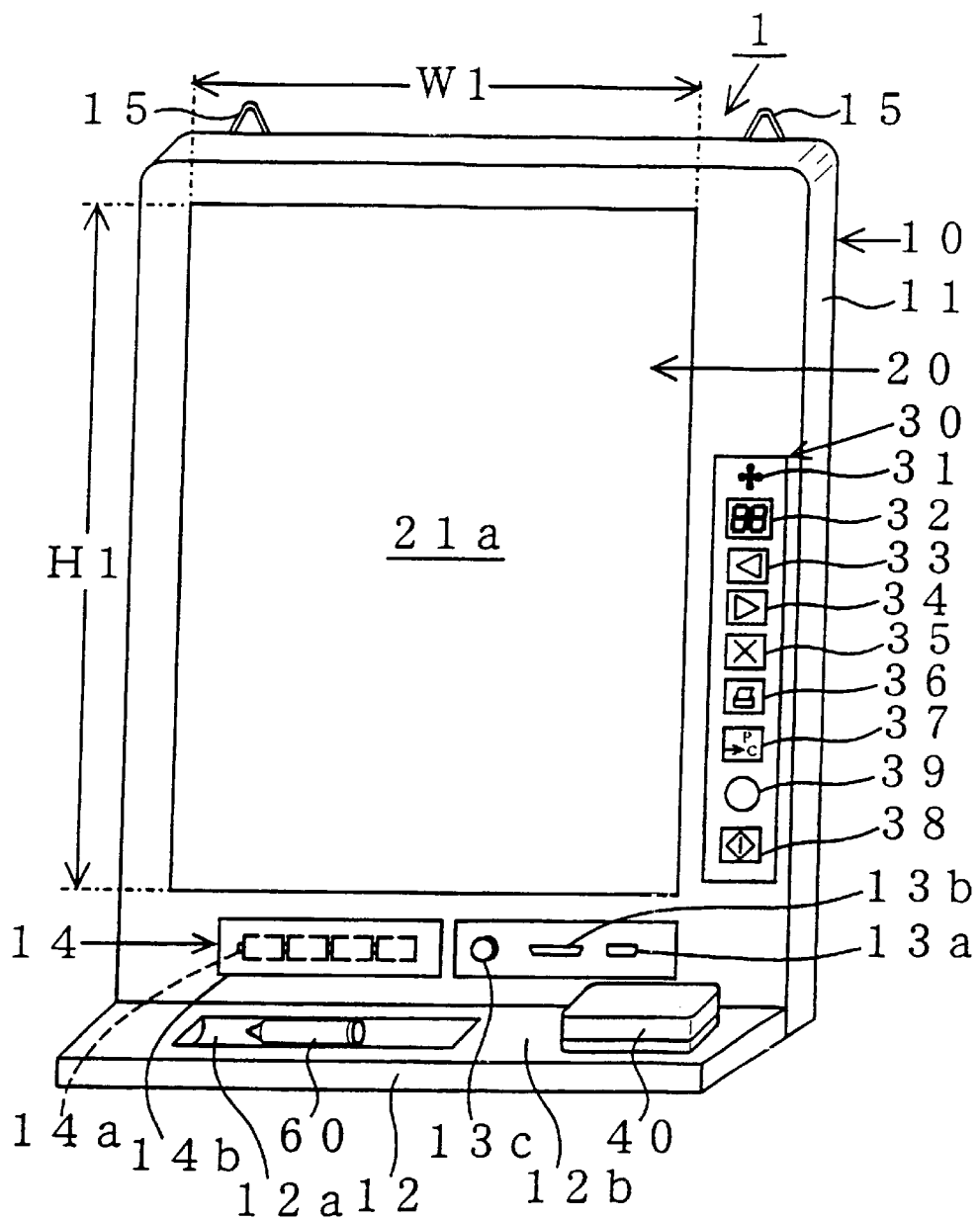
FIG. 1 is an exemplary external perspective diagram showing a main structure of an electronic whiteboard.
Figure 2:
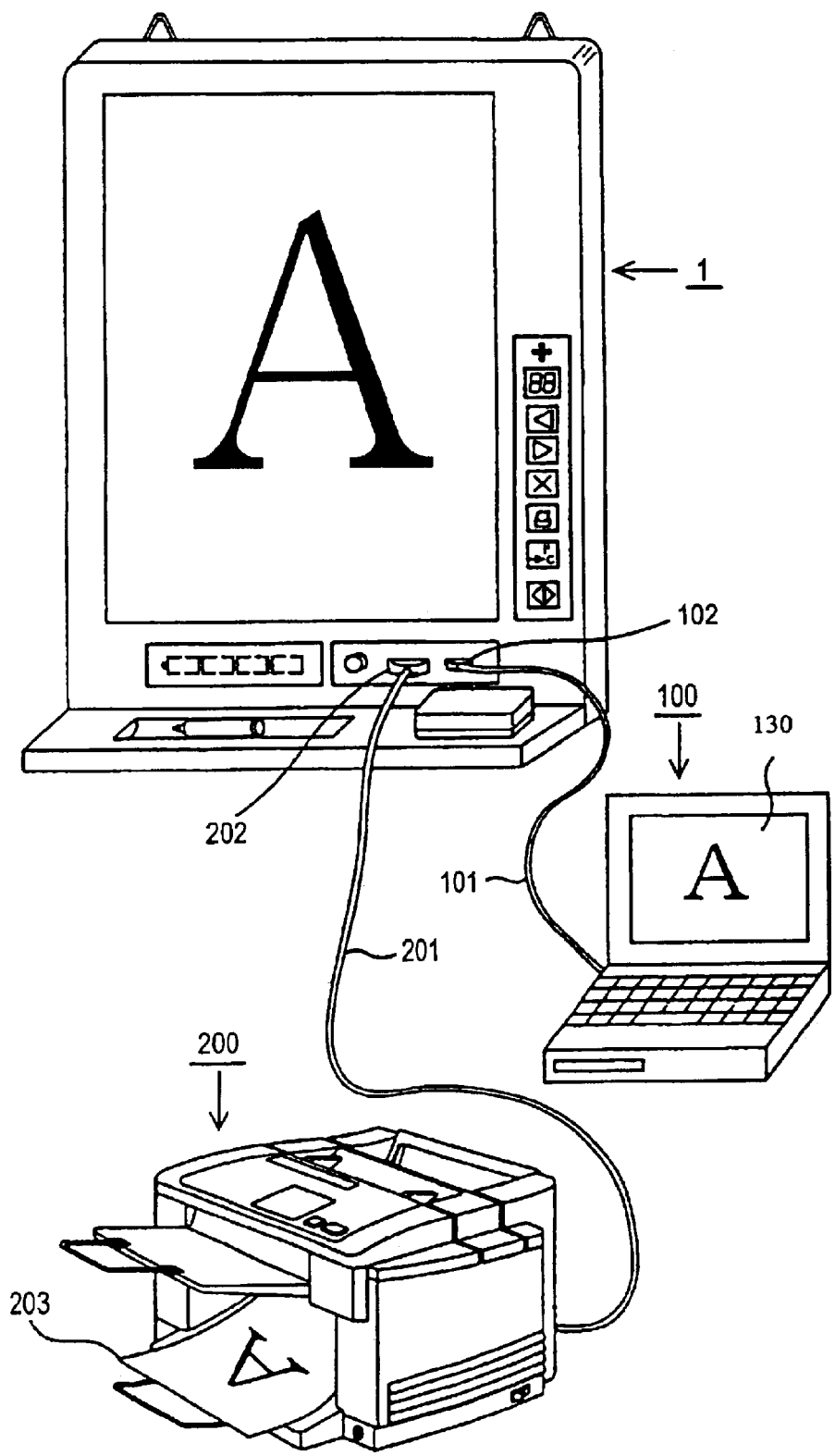
FIG. 2 is an exemplary diagram showing a state in which a personal computer (hereafter referred to as a PC) and a printer are connected to the electronic whiteboard shown in FIG. 1.

First, a main structure of an electronic whiteboard related to a first embodiment is explained with reference to FIGS. 1 and 2. FIG. 1 is an external perspective explanatory diagram showing a main structure of an electronic whiteboard. FIG. 2 is an explanatory diagram showing a state in which a personal computer (hereafter referred to as a PC) and a printer are connected to the electronic whiteboard shown in FIG. 1.

The electronic whiteboard 1 is provided with a writing panel 10, a pen 60 which performs writing on a writing surface 21a, and an eraser 40 which erases a written trace and data showing the written trace. A frame 11 is provided on the writing panel 10. A writing panel main body 20 is incorporated in the frame 11. A platform 12 extends along the bottom edge of the front face of the frame 11, and is fixed so as to protrude out from the panel. A concave portion 12a in a cross-sectional half-round shape is formed on the platform 12 to store a pen 60. To the right of the concave portion 12a, a flat portion 12b is formed to place the eraser 40 or the like.

On the right side of the frame 11, an operating portion 30 is provided. In the operating portion 30, a speaker 31 which reproduces sound such as an operating sound, a warning sound and/or the like, a page number display LED 32 on which the number of pages on which data showing the content written on the writing surface 21a (hereafter referred to as writing data) is displayed by a 7-segment LED, a page return button 33 which returns, page by page, as it is pressed, a page feeding button 34 which feeds, page by page, as it is pressed, an erase button 35 which erases stored writing data, page by page, as it is pressed, a printer output button 36 which is pressed in order to output stored writing data to a printer 200 (FIG. 2), a PC output button 37 which is pressed in order to output stored writing data to a PC 100 (FIG. 2), a "battery out" informing LED 39 which informs when a battery of the pen 60 is dead, and a power source button 38, which is pressed in order to turn this electronic whiteboard 1 on and off, are provided.

A battery case 14, which stores four AA batteries 14a, which are the electric source of the electronic whiteboard 1, is provided at the bottom edge of the front surface of the frame 11. In front of the battery case 14, a cover 14b is attached so as to be openable and closable. Alternatively, the electronic whiteboard 1 may be powered via the standard 110 V (or 220 V) from a wall outlet or generator. In this instance, the batteries may be used as a back-up power source, for example.

To the right of the battery case 14, a volume adjusting lever 13c is provided which adjusts the volume of speaker 31. To the right of the volume adjusting lever 13c, connectors 13b and 13a are provided. As shown in FIG. 2, a plug 202 of a connecting cable 201 connected to the printer 200 is connected to the connector 13b, and a plug 102 of a connecting cable 101 connected to the PC 100 is connected to the connector 13a.

That is, writing data showing the content written on the writing surface 21a of the electronic whiteboard 1 can be output to the PC 100, and the content written on the electronic whiteboard 1 can be seen by a monitor 130 provided with the PC 100. Furthermore, writing data can be output to the printer 200, and the content written in the electronic whiteboard 1 can be printed on printing paper 203.

Furthermore, at both ends of the upper edge of the back surface of the frame 11, hooks 15 and 15 are fixed to hang up this electronic whiteboard 1 against a wall.

In this first embodiment, the height H1 of the writing surface 21a is 900 mm, and the width W1 is 600 mm. Additionally, the frame 11 and the platform 12 are made to be light-weight by being formed of synthetic resin such as polypropylene or the like. The total weight of the electronic whiteboard 1 is less than or equal to 10 kg Furthermore, a coil which generates an alternating magnetic field, an oscillating circuit, batteries, and the like are housed in the eraser 40.

Figure 3:
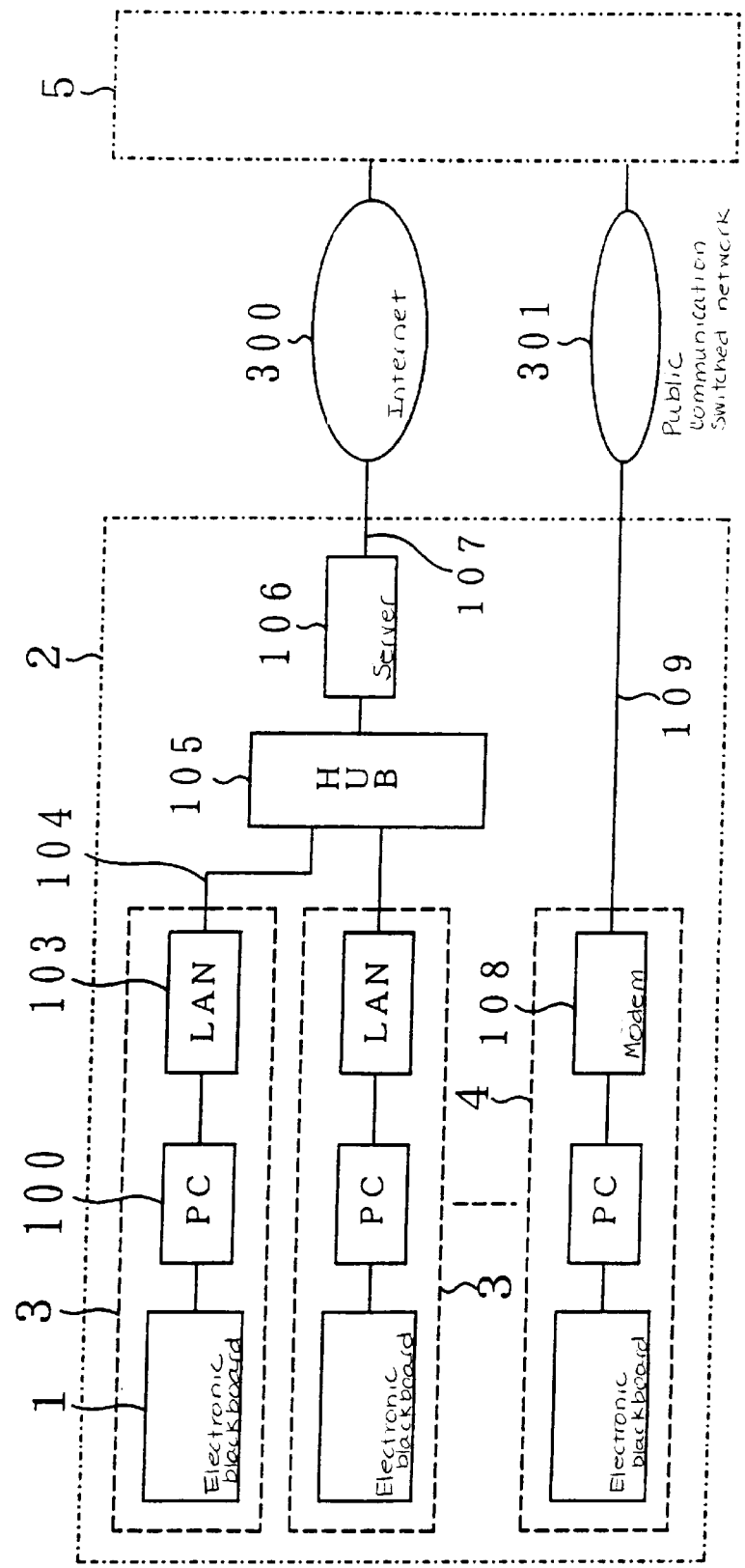
FIG. 3 is an exemplary block diagram of a network structure used when communication is performed between an electronic whiteboard and another electronic whiteboard.

Next, a structure of a network used when communication is performed between the electronic whiteboard 1 and another electronic whiteboard 1 is explained with reference to FIG. 3, which is a block diagram.

Furthermore, here, an example is explained of a case in which communication is performed between companies, or between a plurality of rooms, each provided with an electronic whiteboard 1, within a company.

In rooms 3 of a company 2, an electronic whiteboard 1, a PC 100 connected to the electronic whiteboard 1, and a LAN board 103 connected to this PC 100 are provided. In room 4, an electronic whiteboard 1, a PC 100 connected to this electronic whiteboard 1, and a modem 108 connected to the PC 100 are provided. The LAN board 103 provided in each room 3 is connected to a HUB 105 by a LAN cable 104. Furthermore, the HUB 105 is connected to a server 106, and the server 106 is connectable to another company 5 via a link 107 that connects to an Internet 300. Furthermore, the modem 108 provided in room 4 is connectable to the other company 5 via a public communication network 301 from a telephone line 109.

Furthermore, though not depicted here, but within the other company 5, in the same manner as in company 2, an electronic whiteboard 1 which is provided can communicate via a PC.

Here, a flow of data in the network is explained. Writing data stored in the electronic whiteboard 1 provided in one of the rooms 3 is transmitted from the PC 100 in that same room 3 to the PC 100 of a designated room 3 via LAN boards 103 and HUB 105. Then, a person who receives this data can view the content of the data by displaying the received data on the monitor 130 provided with the PC 100 (FIG. 2), or by printing the received data on paper 203 by the printer 200 connected to the PC 100 (FIG. 2).

Furthermore, the writing data can be attached as an image file to an electronic mail in, for example, TIFF (Tag Image File Format) format and can be transmitted to the other company 5 via the Internet 300 from the server 106. By so doing, the other company 5 can see the content of the writing data by decoding the image file attached to the electronic mail transmitted from company 2.

Figure 4:
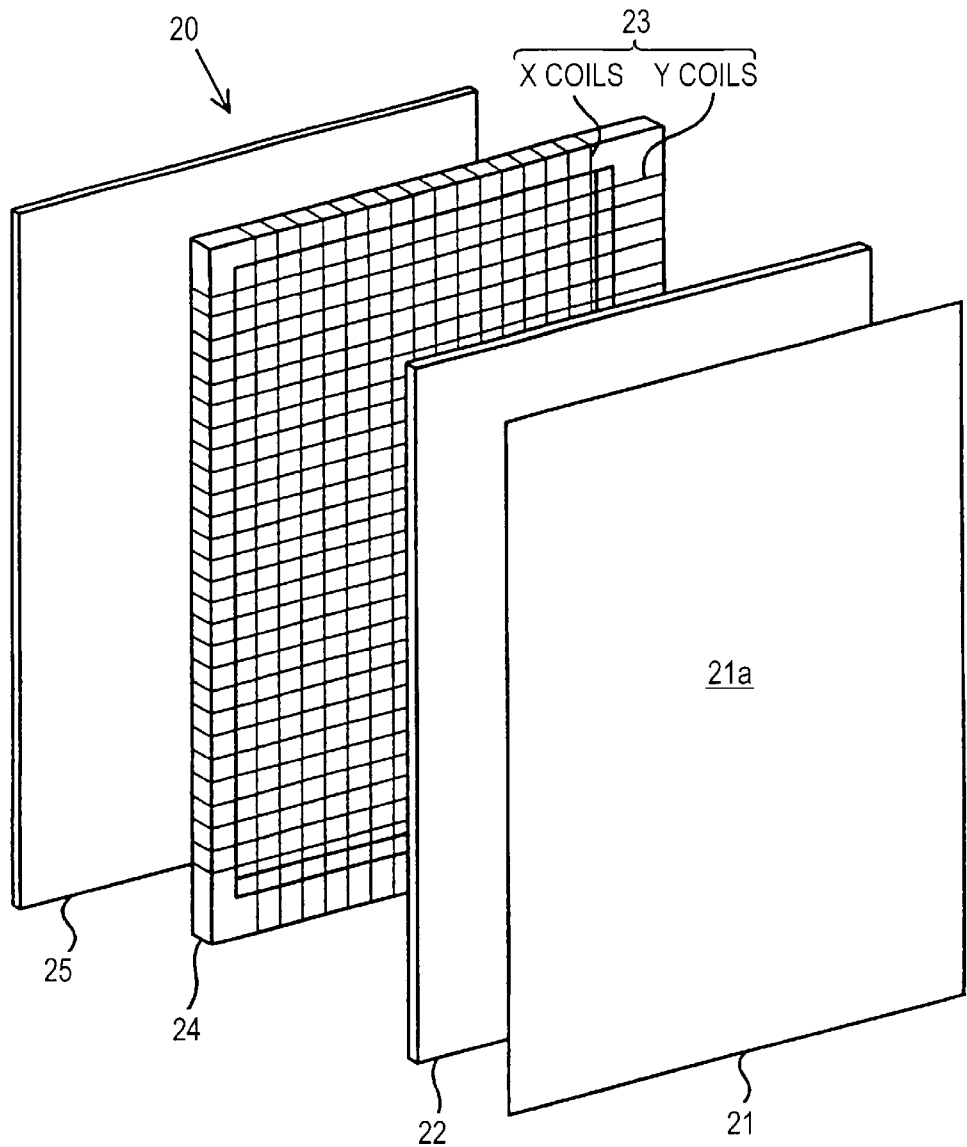
FIG. 4 is an exemplary diagram showing various structural members of the writing panel main body.

FIG. 4 is an explanatory diagram showing various structural members of the writing panel main body 20. The writing panel main body 20 has a structure in which a writing sheet 21 with a writing surface 21a, a plate-like panel 22, a frame shaped attaching panel 24 in which sense coils 23 are arranged, and a plate-like back panel 25 are successively laminated.

In this embodiment, the writing sheet 21 is formed at a thickness of 0.1 mm by a PET (polyethylene terephthalate) film. The panel 22 is formed at a thickness of 3.0 mm by acrylic resin, ABS (acrylonitrile-butadien-styrene copolymer), PC (polycarbonate), or the like. Furthermore, the attaching panel 24 is formed at a thickness of 40 mm by a foaming resin fabricating material such as foaming styrene. The back panel 25 is formed at a thickness of 1.0 mm by a conductive material such as aluminum. Furthermore, the overall thickness of the frame 11 sandwiching each edge portion of the writing panel main body 20 is 50 mm.

Figure 5A:
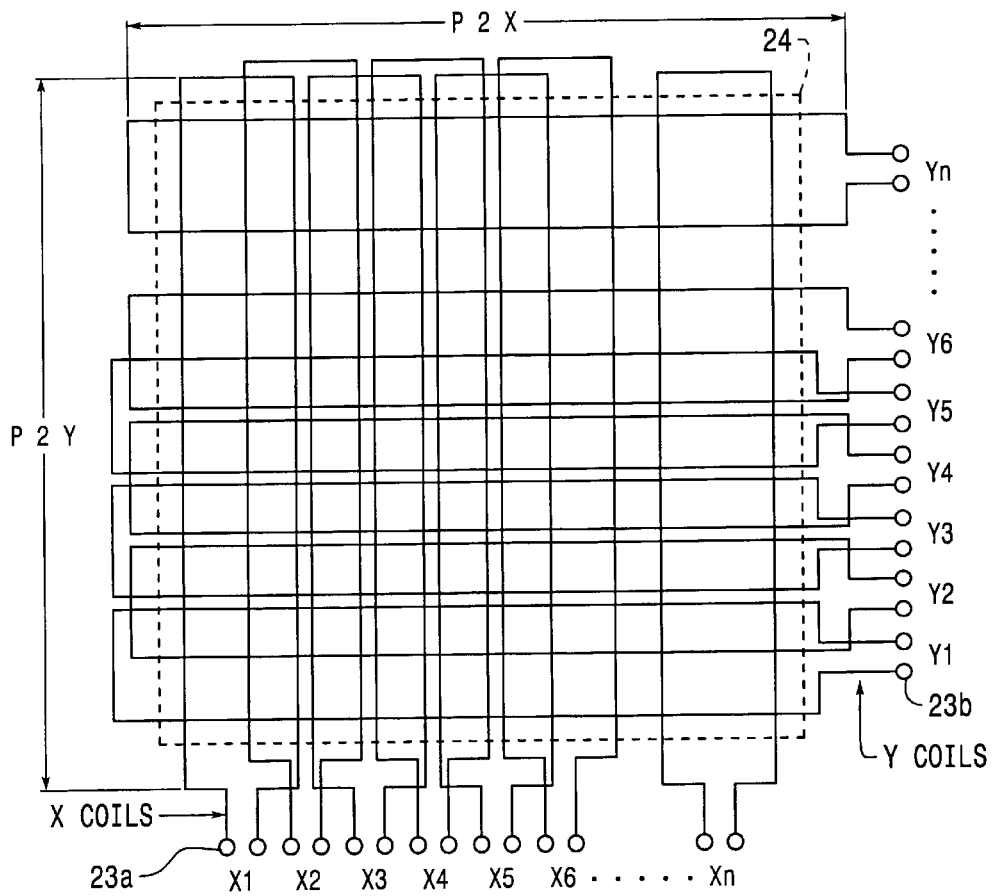
FIG. 5(A) is an explanatory diagram showing a structure of the sense coils shown in FIG. 4, with a portion omitted.
Figure 5B:
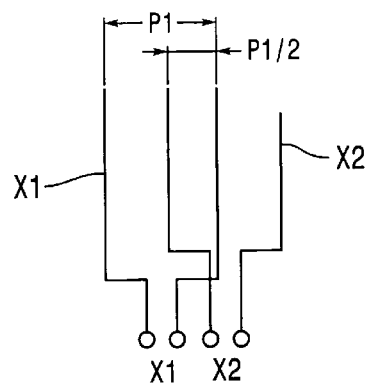
FIG. 5(B) is an explanatory diagram showing a width and overlapping pitch of the sense coils, shown in FIG. 5(A)

FIG. 5(A) is an explanatory diagram showing a structure of the sense coils 23 shown in FIG. 4, with a portion omitted. FIG. 5(B) is an explanatory diagram showing a width and overlapping pitch of the sense coils 23 shown in FIG. 5(A).

Furthermore, in the following explanation, sense coils among the sense coils 23 which are arranged in an X-axis direction are called X coils, and sense coils arranged in the Y-axis direction are called Y coils.

As shown in FIG. 5(A), in the X-axis direction, m coils X1–Xm are arranged which detect an X coordinate of the pen 60 and the eraser 40. In the Y-axis direction, n Y coils Y1–Yn, which detect the Y coordinate, are arranged perpendicularly to the X coils. The X coils and the Y coils are each formed in a substantially rectangular shape, and the length of the long side of the rectangular portion is P2X and P2Y, respectively.

Figure 9:
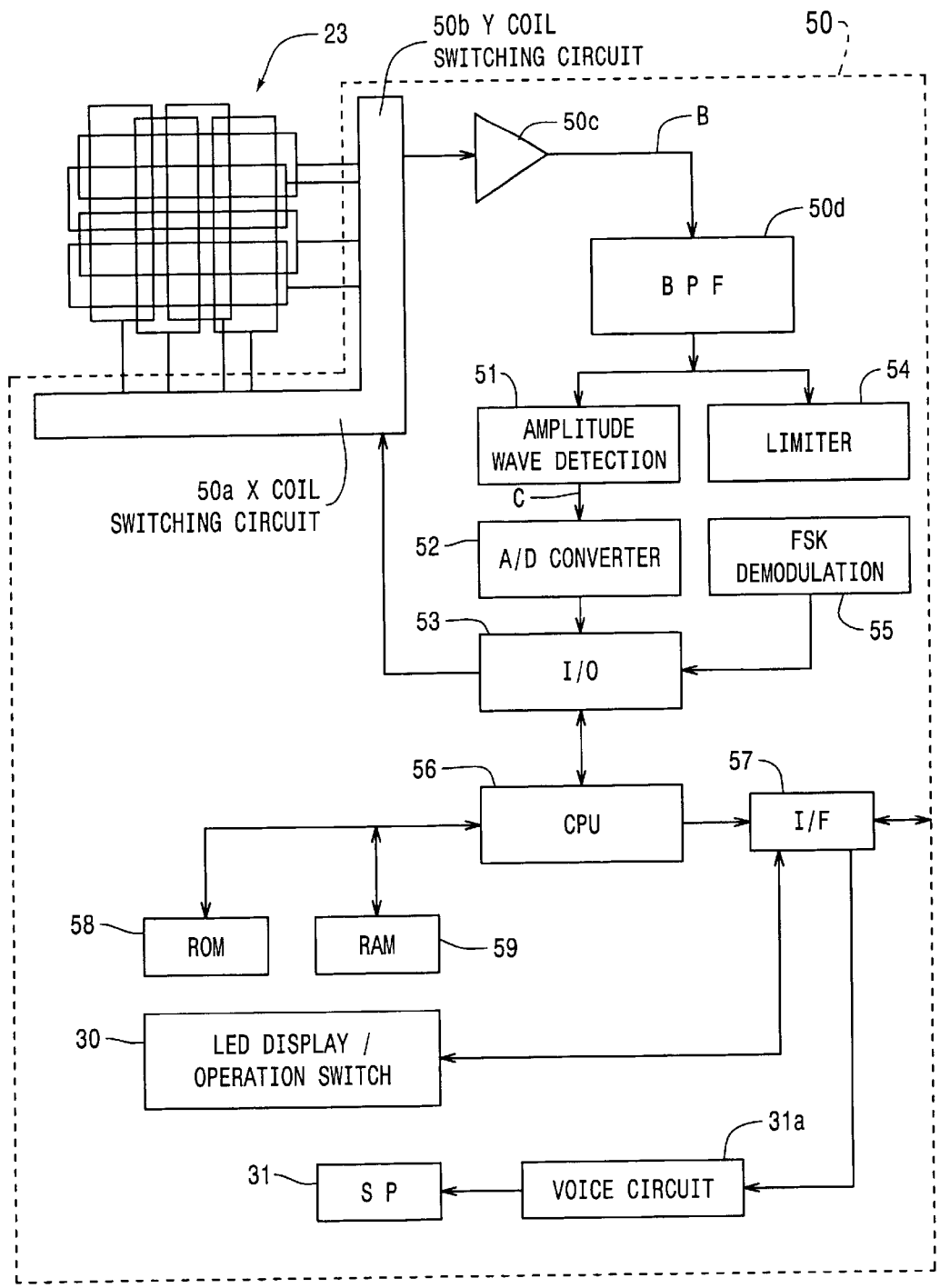
FIG. 9 is an explanatory block diagram showing an electrical structure of the electronic whiteboard 1 in blocks.

As shown in FIG. 5(B), the X coils are each formed with a width (the length of the short side of the rectangular portion) of P1, and adjacent X coils are overlapped at a pitch of P1/2. Each Y coil is also formed at width P1, respectively. Adjacent Y coils are overlapped at a pitch of P1/2, respectively. Furthermore, each terminal 23a of the X coils is connected to an X coil switching circuit 50a and each terminal 23b of the Y coils is connected to a Y coil switching circuit 50b (FIG. 9).

In this first embodiment, P1=50 mm, P2 X=680 mm, and P2Y=980 mm. Furthermore, m=22, and n=33. Additionally, the X coils and Y coils are formed by copper lines with a diameter of 0.35 mm and having an insulating film layer (e.g., an enamel layer) on the surface.

Furthermore, in FIG. 5(A), in order to clarify the arrangement of the coils, the arms of each coil are drawn so as not to overlap, but, in reality, the short portions of each Y coil Y1, Y2, Y3, . . . overlap the long portions of the X coils, X1 [, X2, X3, . . . ]. Furthermore, terminals 23a and 23b are structured that that the intervals therebetween are minimum.

Next, a positional coordinate table which detects a positional coordinate of the pen 60 on the writing surface 21a is explained with reference to FIGS. 6 and 7.

Figure 6A:
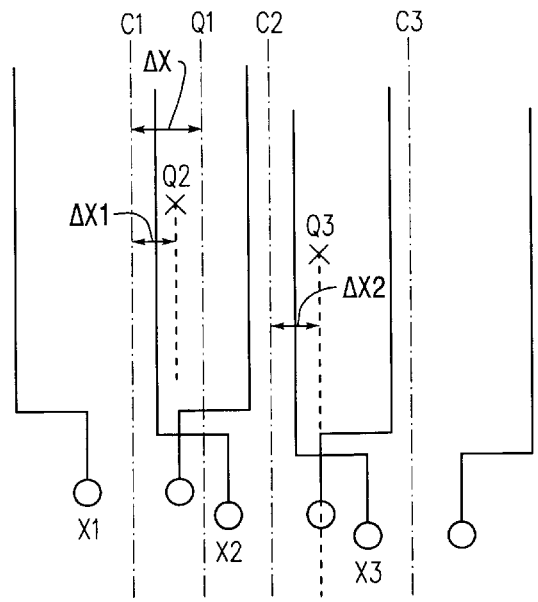
FIG. 6(A) is an explanatory diagram showing part of X coils X1–X3.
Figure 6B:
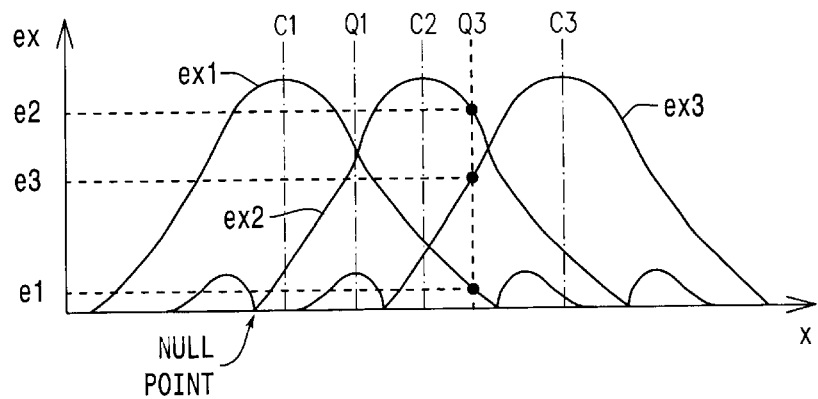
FIG. 6(B) is a graph showing relationship between a voltage generated in X coils X1–X3 and the distance of the width direction shown in FIG. 6(A)
Figure 6C:
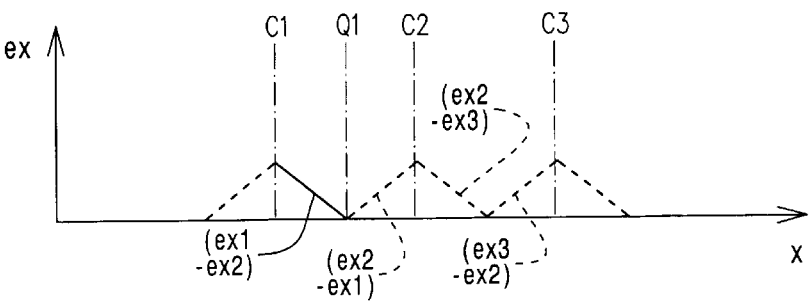
FIG. 6(C) is a graph showing a voltage difference between mutually adjacent sense coils among X coils X1–X3 shown in FIG. 6(A)
Figures 7A, 7B, 7C:
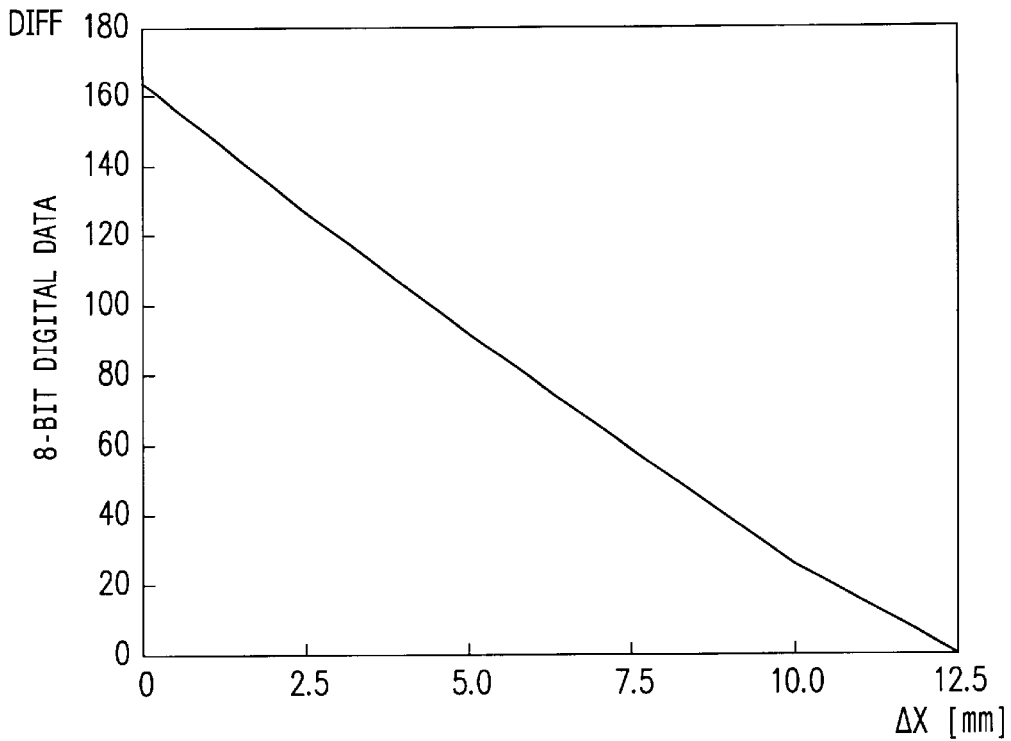
FIG. 7(A) is an explanatory diagram showing a graph of a positional coordinate table.
FIG. 7(B) is an explanatory diagram of a positional coordinate table.
FIG. 7(C) is an explanatory diagram showing a memory state of detected values which were detected from each X coil.

FIG. 6(A) is an explanatory diagram showing part of X coils X1–X3. FIG. 6B is a graph showing relationship between a voltage generated in X coils X1–X3 and the distance of the width direction shown in FIG. 6(A). FIG. 6(C) is a graph showing a voltage difference between mutually adjacent sense coils among X coils X1–X3 shown in FIG. 6(a). FIG. 7(A) is an explanatory diagram showing a graph of a positional coordinate table. FIG. 7(B) is an explanatory diagram of a positional coordinate table. FIG. 7(C) is an explanatory diagram showing a memory state of detected values which were detected from each X coil.

In FIGS. 6(A)–6(C), the center lines of X coils X1, X2, X3 are C1, C2, C3, respectively. Voltages generated in X coils X1, X2, X3 are ex1, ex2, ex3, respectively. As shown in FIG. 6(B), the voltages ex1–ex3 become maximum at the centers C1–C3 of the sense coils, and become small approaching the end portions in the long direction [of the coils]. Furthermore, each coil is overlapped at P1/2 so that its null point, that is, the point at which the voltages ex1–ex3 are 0, respectively, is outside of the center of the adjacent coils.

Additionally, as shown in FIG. 6(C), a voltage difference between mutually adjacent sense coils among X coils X1–X3 has a maximum value at the centers C1–C3 of said coils, respectively. A mid-point between the centers of sense coils and the long portions of the sense coils, that is, a mid-point of the portion where adjacent sense coils are overlapped, is 0 in the graph.

For example, in FIG. 6(C), the right half portion (portion shown in a solid line) of the graph showing (ex1–ex2) shows the relationship between (ex1–ex2) and the distance from the center C1 of X coil X1 to the mid-point Q2 of the portion overlapped by X coil X2 (½ of the overlapping pitch, that is, P1/4). Here, if the pen 60 temporarily exists at point Q2, if (ex1–ex2) is detected, the distance ΔX1 from center C1 to point Q2 can be detected, so an X coordinate of point Q2 can be obtained.

In this embodiment, since the coil width P1 is 50 mm, P1/4=12.5 mm. For example, in FIG. 6(C), if the portion showing the characteristic of (ex1–ex2) (portion drawn in a solid line) is converted to 8 bits of digital data, the graph shown in FIG. 7(A) is obtained. If this graph is converted to a table format, the positional coordinate table 58a shown in FIG. 7(B) is obtained. This positional coordinate table 58a is stored in a ROM 58 (FIG. 9) or the like and used for calculation of a positional coordinate of the pen 60.

Figure 8A:
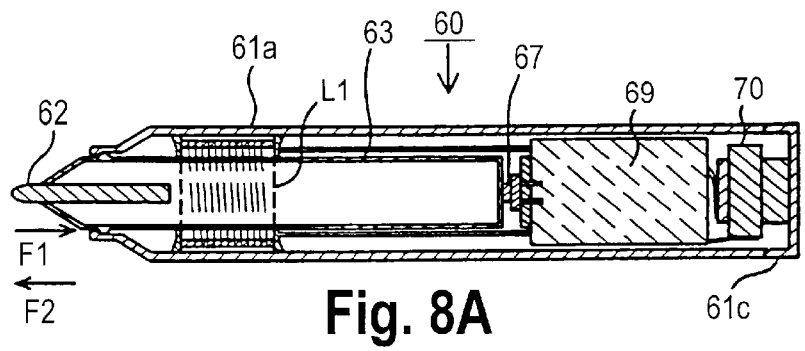
FIG. 8(A) is an explanatory diagram showing an internal structure of a pen and FIG. 8(B) is an explanatory diagram showing an electrical structure of the pen shown in FIG. 8(A)
Figure 8B:
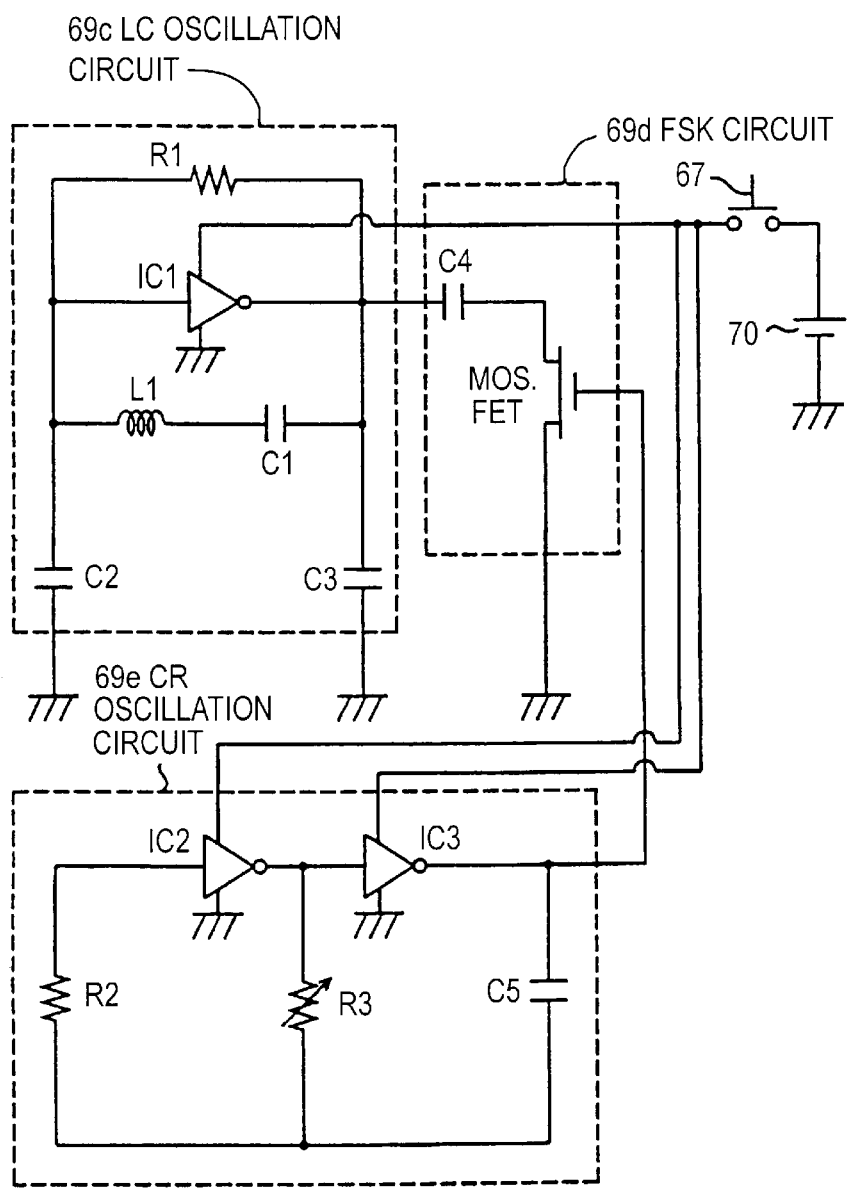

FIG. 8(A) is an explanatory diagram showing an internal structure of a pen 60 and FIG. 8(B) is an explanatory diagram showing an electrical structure of the pen 60 shown in FIG. 8(A).

In the pen 60, a body part 61a in a cylindrical shape and a cover 61c which is removably attached to the back end of this body part 61a are provided. Inside the body part 61a, a coil L1, an ink cartridge 63 which can be removed in the direction shown by arrow F2, a pen tip 62 inserted into the ink cartridge 63, a circuit board 69 in which an oscillation circuit and/or the like to generate an alternating magnetic field from the coil L1 is mounted, and a battery 70, which supplies electric power to the circuit substrate 69, are provided.

Additionally, between the ink cartridge 63 and the circuit board 69, a push-button-type switch 67 is provided which supplies and cuts off electric power from/to the oscillation circuit and/or the like. When the pen tip 62 is pushed against the writing surface 21a (FIG. 1) and the ink cartridge 63 is moved in the direction shown by arrow F1, the switch 67 is turned on, and when the ink cartridge 63 returns in the direction shown by arrow F2, the switch 67 is turned off. That is, when writing is performed by the pen 60 on the writing surface 21a, the alternating magnetic field is generated from the coil L1.

As shown in FIG. 8(B), a circuit mounted on the circuit board 69 includes a CR oscillation circuit 69e, in which a different modulation frequency is set for each characteristic of the pen, such as thickness of a pen tip, ink color and/or the like, an LC oscillation circuit 69c which oscillates a carrier wave which carries a signal oscillated from the CR oscillation circuit 69e, and an FSK circuit 69d, which FSK (Frequency Shift Keying) modulates the oscillation frequency of the LC oscillation circuit 69c according to the modulation frequency of the CR oscillation circuit 69e. The oscillation frequency of the carrier wave is determined by an inductance L1 and capacitors C1, C2, C3 which form the LC oscillation circuit 69c, and the modulation frequency is determined by a capacitor C5 and resistances R2 and R3 which form the CR oscillation circuit 69e. Additionally, frequency variation of the oscillation frequency of the carrier wave is determined by the capacitance of a capacitor C4 of the FSK circuit 69d.

Figures 10A, 10B:
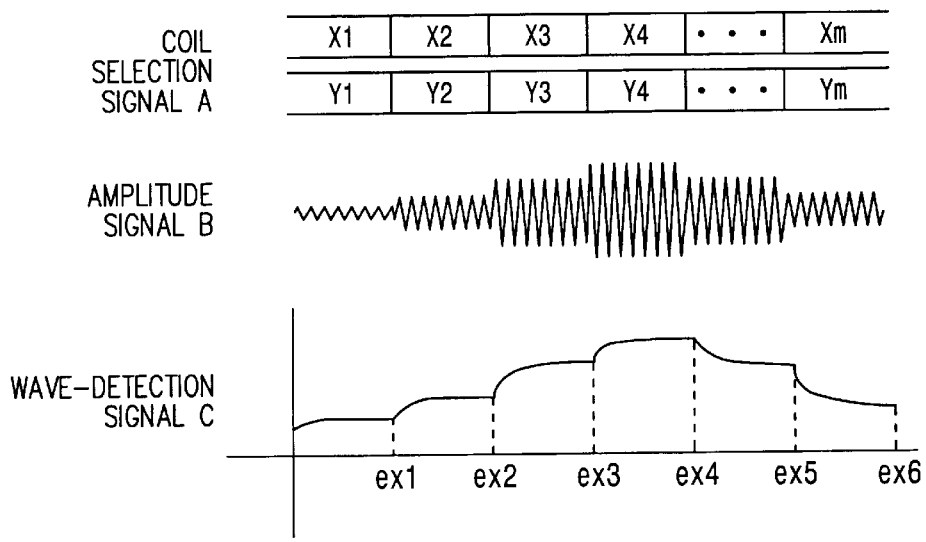
FIG. 10(A) shows the relationship between the characteristic of the pen and modulated frequency being set.
FIG. 10(B) is an explanatory diagram showing signals at points A, B, and C in FIG. 9.

The relationship between the characteristic of the pen 60 and modulated frequency fm is set as shown in FIG. 10(A), which explains the relationship. In FIG. 10(A), "thin" indicates that the pen tip 62 (FIG. 8(A)) is thin, and "thick" indicates that the pen tip 62 is thick. For example, "black thick" indicates a pen in which the pen tip is thick and black ink is used.

Furthermore, the eraser 40 also has a coil, and a range erased by the eraser 40 is calculated based upon a signal generated in the sense coils by the alternating magnetic field generated from the coil in the eraser 40, so a modulation frequency fin is also allotted to the eraser 40 to distinguish the eraser from the pen(s) 60.

Furthermore, when the switch 67 is turned on, the electric power of the battery 70 is supplied to each circuit, output of the integrated circuit IC3 of the CR oscillation circuit 69e switches a MOS FET gate of the FSK circuit 69d, and the carrier wave oscillated from the LC oscillation circuit 69c is frequency modulated by a signal oscillated from the CR oscillation circuit 69e.

In the first embodiment, the center frequency of a carrier wave is 410 kHz and the frequency variation is ±20 kHz. Furthermore, in this first embodiment, the integrated circuit IC1 is TC7SLU04F made by Toshiba, and integrated circuits IC2 and IC3 are both U04 made by Toshiba. Furthermore, the MOS FET is 2SK2158. Resistance R1 and resistance R2 are both 1 MΩ, and the variation range of variable resistance R3 is 0 Ω–1 MΩ. Capacitors C1, C4 and C5 are 0.1 $\mu$F, 0.0015 $\mu$F and 100 pF, respectively, and capacitors C2 and C3 are both 0.0033 $\mu$F. Furthermore, the battery 70 is LR44, and the voltage is approximately 1.5 V.

Figure 11:
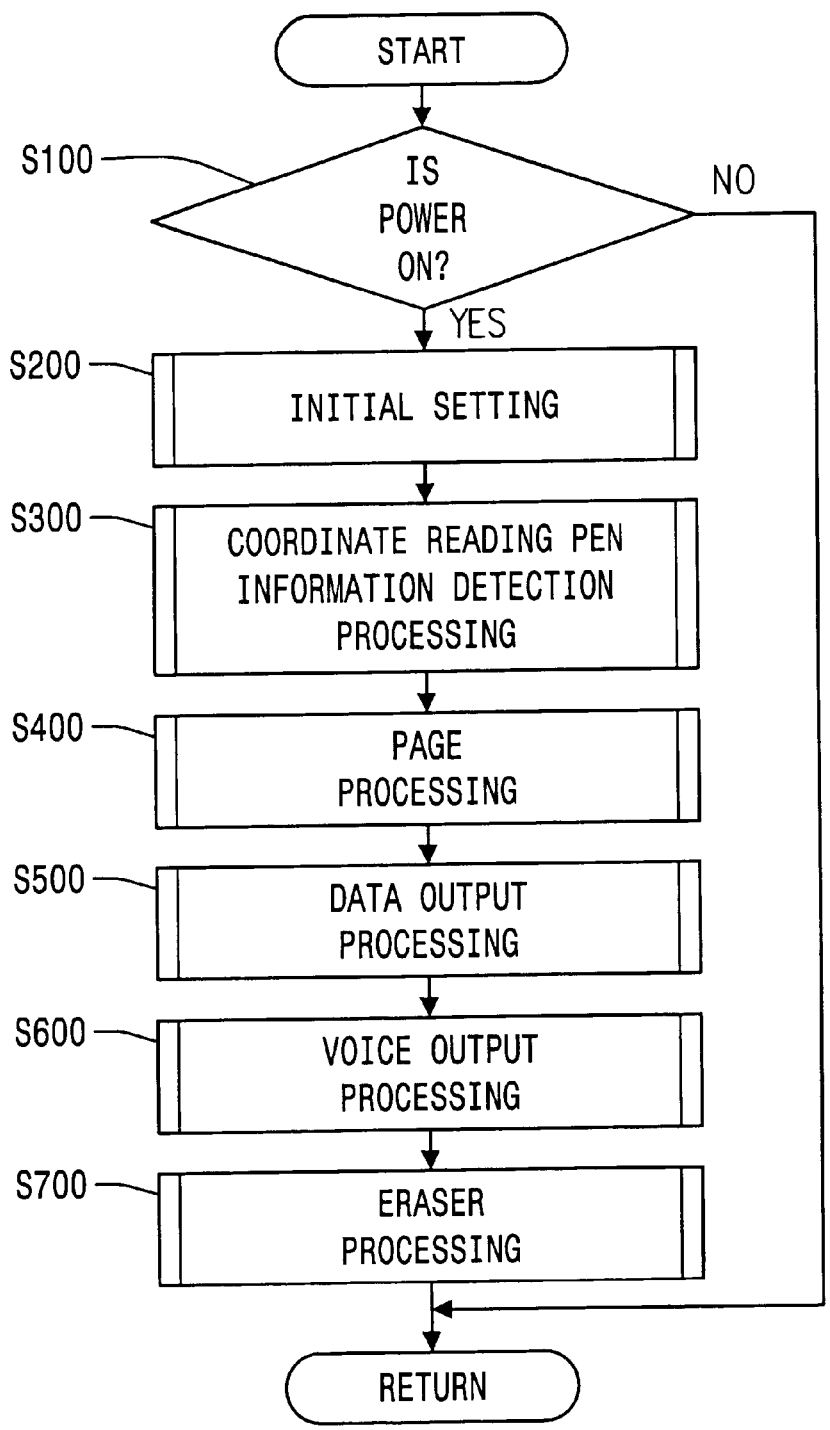
FIG. 11 is a flowchart showing a main control content implemented by the CPU 56 shown in FIG. 9.

FIG. 9 is an explanatory diagram showing an electrical structure of the electronic whiteboard 1 in blocks. FIG. 10(B) is an explanatory diagram showing signals at points A, B, and C in FIG. 9. FIG. 11 is a flowchart showing a main control content implemented by the CPU 56 shown in FIG. 9.

When the CPU 56 provided in the controller 50 shown in FIG. 9 detects that a power button 38 (FIG. 1) is turned on (step (hereafter referred to as S) 100: Yes), initial settings are performed, such as loading a control program, stored in the ROM 58, and a positional coordinate table 58a (FIG. 7(B)) to a work area of the RAM 59 (S200), and coordinate reading/pen information detecting processing is performed (S300).

Figure 12:
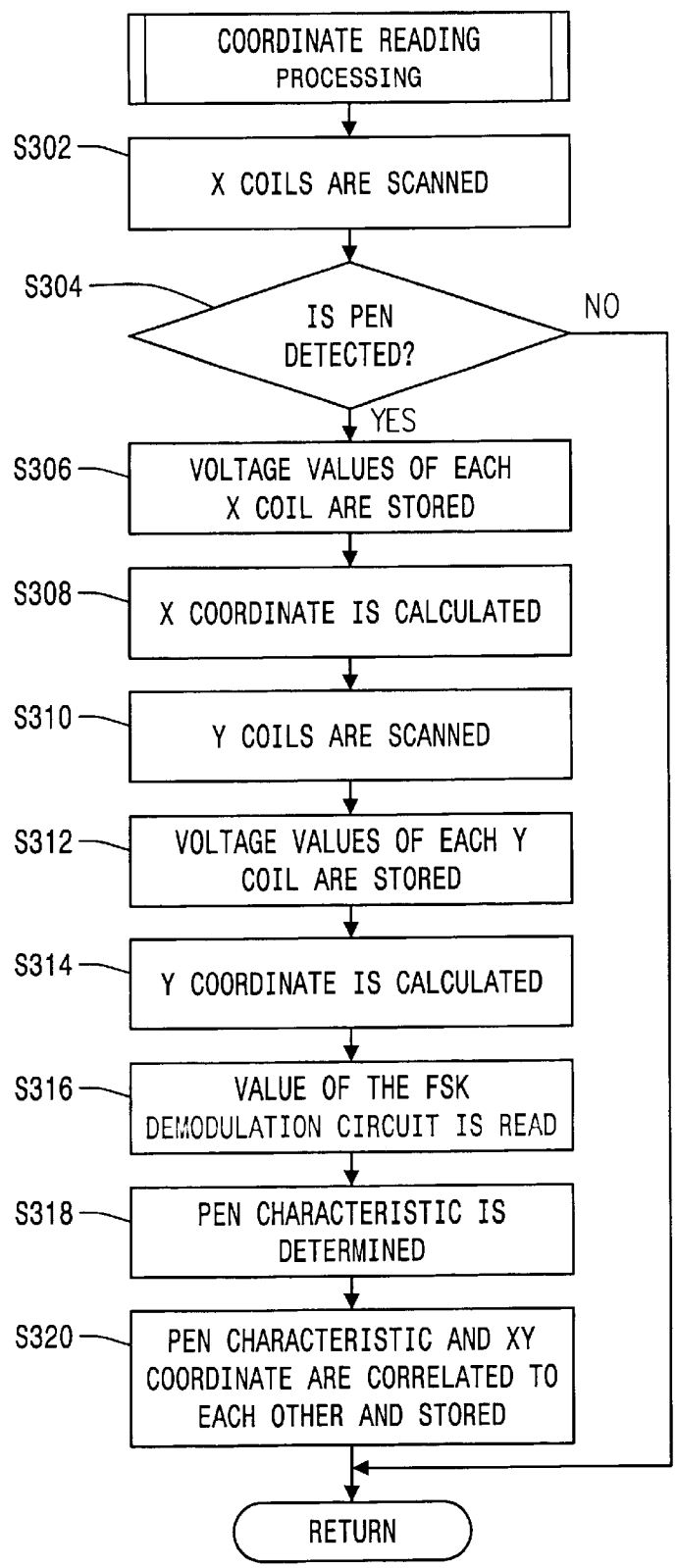
FIG. 12 is an exemplary flowchart of the coordinate reading processing.

The coordinate reading processing is explained with reference to the flowchart of FIG. 12. The CPU 56 scans X coils X1–Xm by outputting a coil selecting signal A (FIG. 10(B)), which successively selects X coils X1–Xm, to the X coil switching circuit 50a via the input/output circuit (I/O) 53 (S302). Subsequently, a signal generated by magnetic coupling between an alternating magnetic field generated by the coil L1 of the pen 60 and one of X coils is amplified by an amplifier 50c (FIG. 9), and the amplified signal (FIG. 10(B)) has unnecessary band regions filtered by a band pass filter (BPF) 50d, and is amplitude wave-detected by an amplitude wave detection circuit 51. Subsequently, the signal which was amplitude wave-detected (FIG. 10(B)) is converted to an amplitude, that is, to a digital signal corresponding to a voltage value, by an A/D converting circuit 52, and is input to the CPU 56 via the input/output circuit 53.

Next, the CPU 56 determines that the pen 60 was detected (S304: Yes), and voltage values e1–em shown by the digital signal in which the X coils X1–Xm (all of the coils) are scanned and input are successively stored in a voltage value memory area 59a of RAM 59, corresponding to the coil numbers of the X coils, as shown in FIG. 7(C) (S306). Next, the CPU 56 calculates the X coordinate of the pen 60, based upon each voltage value stored in the voltage value memory area 59a (S308), through the following procedure.

First, a maximum voltage value emax is selected from among the voltage values e1–em stored in the voltage value memory area 59a, and the coil number (hereafter referred to as max) of the X coil in which the voltage value emax is generated is stored in RAM 59.

For example, when the pen 60 exists at position Q3 as shown in FIG. 6, and when voltage values e1, e2, e3 are generated from X coils X1, X2, X3, respectively, as shown in FIG. 6(B), the maximum voltage value e2 is selected and the coil number 2 of the X coil which generated the voltage value e2 is stored in the RAM 59.

Furthermore, the CPU 56 determines the larger voltage among the adjacent voltage values emax ±1 of emax, and the coil number (hereafter referred to as max2) of the X coil which generated the determined voltage value is stored in the RAM 59.

In the example shown in FIG. 6, the voltage value e3, which is the larger value among the voltage values e3 and e1 adjacent to e2, is determined, and the coil number 3 of the X coil which generated the voltage value e3 is stored in RAM 59 as max2.

Next, the CPU 56 compares the coil number max and the coil number max2 and determines whether the coil number max2 exists in the − direction or the + direction of the X axis from the coil number max. Furthermore, if max2≦max, a variable SIDE is set at 1, and if max2<max, the variable SIDE is set at −1. In the example shown in FIG. 6, because max=2 and max2=3, max2>max and the variable SIDE is set at 1.

Subsequently, the CPU 56 calculates:

$$\text{DIFF}=e(\text{max})-e(\text{max2})\ldots(1)$$

The positional coordinate which is closest to the calculated DIFF is read from the positional coordinate table 58a stored in the ROM 58 and defined as OFFSET. Next, the CPU 56 calculates:

$$X1=(P1/2)x\text{max}+\text{OFFSET}\times\text{SIDE}\ldots(2)$$

This obtains the X coordinate X1. Here, (P1/2) x max shows the X coordinate of the center of the coil number max. In the example shown in FIG. 6, Equation (2) is X=(P1/2)× 2+(e2−e3), and the X coordinate of position Q3 is a distance corresponding to (e2−e3) in a + direction of the X axis from the center line C2 of the X coil X2, for example, a coordinate which is distant by ΔX2.

Furthermore, the CPU 56 scans each Y coil (S310), and voltage values detected from each Y coil are stored in a voltage value memory area of RAM 59 for the Y coils (S312). Next, the CPU 56 calculates the Y coordinate of the pen 60 by using the same method as in the calculation of the X coordinate in S308 described earlier (S314).

Now the concept of electronic whiteboard hot zones will be defined in relation to the structure set forth above.

Figure 13:
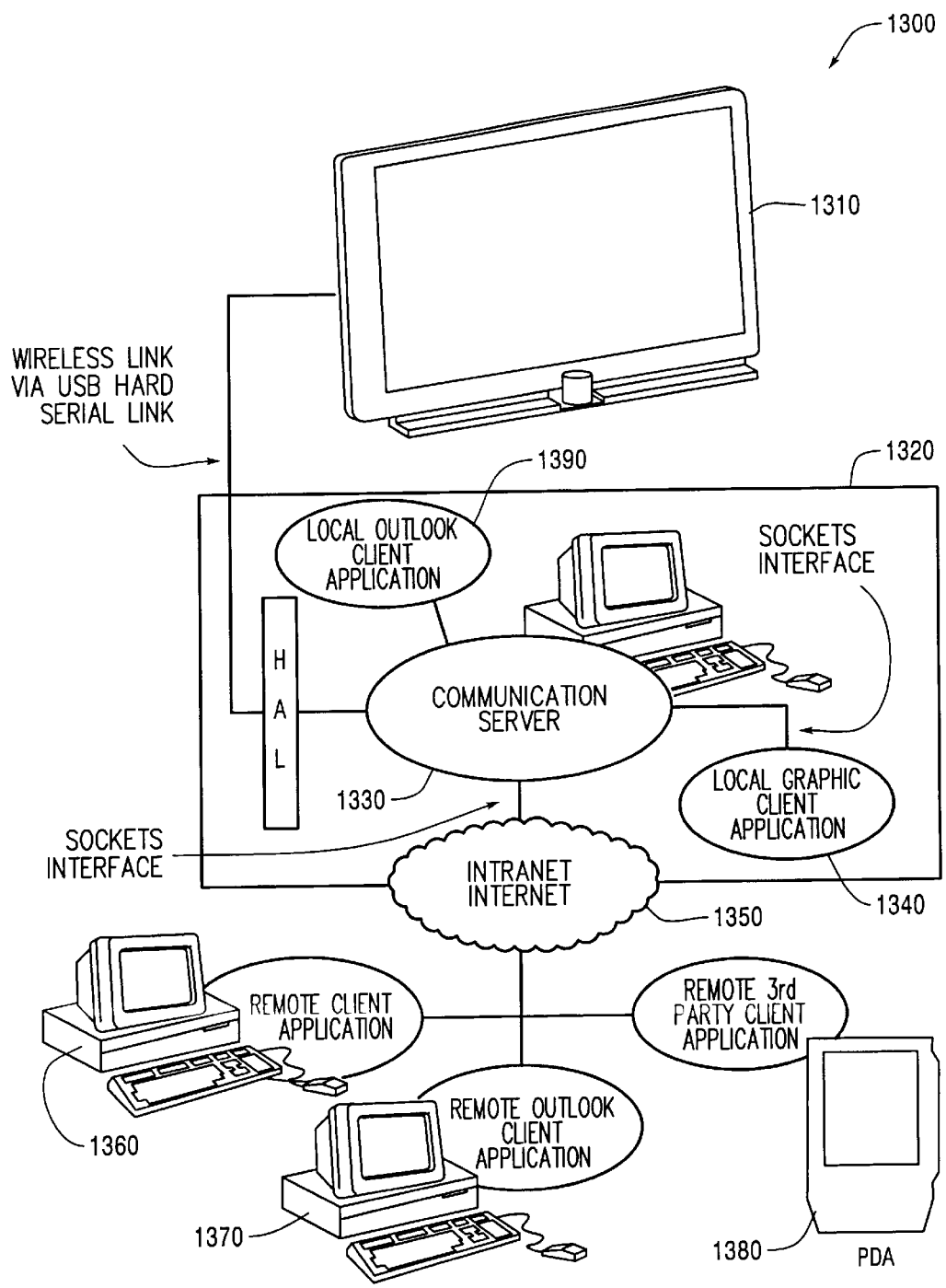
FIG. 13 is another embodiment of an electronic whiteboard that is linked through a network to other electronic devices.

FIG. 13 is another embodiment of an electronic whiteboard that is linked through a network to other electronic devices. The communications system 1300 includes the electronic whiteboard 1310, which may be structured as discussed above in relation to FIGS. 1–12 which includes an electronic pen, such as the pen 60, and a PC environment 1320 connected to the electronic whiteboard 1310, which also includes a local Microsoft Outlook™ client application 1390, a communication server 1330 and a local graphics client application 1340. The PC environment 1320 is further connected to a network, namely an Internet and/or intranet 1350, which is linked to one or more other personal computers 1360, 1370 and/or personal digital assistants (PDA) 1380.

The communications system 1300 operates such that the communication server 1330 monitors the user's activity on the electronic whiteboard 1310 and may perform the functions of a controller. Upon receiving a signal, such as detection of a user's pen in a hot zone area defined on the electronic whiteboard 1310, the communication server 1330 may perform a function locally or transmit a signal through the intranet/Internet to any or all of the PCs/PDAs 1360, 1370, 1380, so that an action may be performed remotely.

Furthermore, communication between the electronic whiteboard 1310 and the communication server 1330 may be conducted either directly or remotely through a variety of ways known to those skilled in the art, such as wireless, serial, USB, Ethernet, the Internet, intranet, etc. Therefore, the electronic whiteboard 1330 does not have to be directly or indirectly connected to its controlling element.

Figure 14:
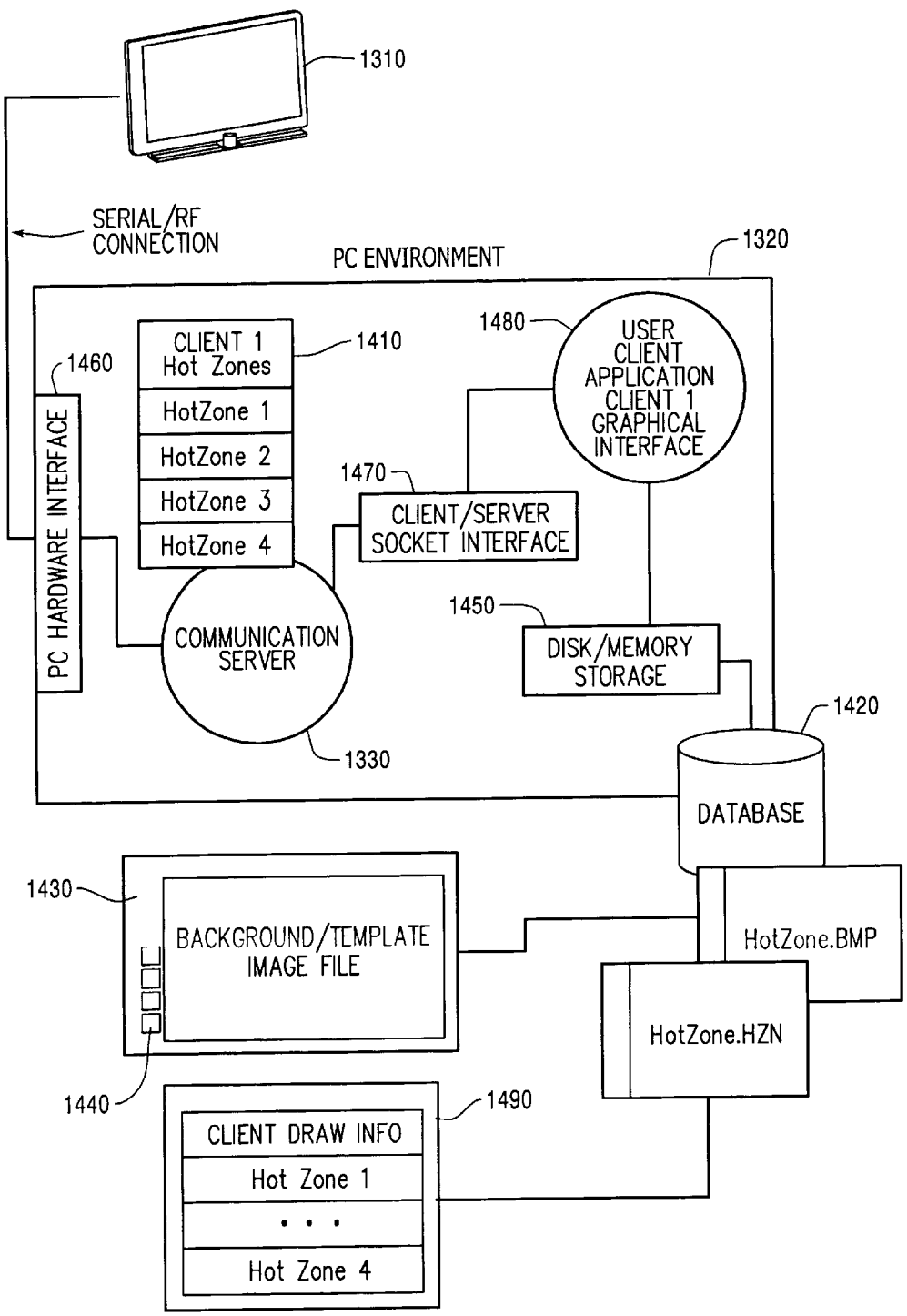
FIG. 14 is a diagram of the PC environment in which the electronic whiteboard operates.

FIG. 14 is a diagram of the PC environment in which the electronic whiteboard 1310 operates. The PC environment 1320 includes the communication server 1330 which is connected to the electronic whiteboard 1310 through the PC hardware interface 1460 and connected to a disk/memory storage 1450 through the client/server socket interface 1470 and user client application client 1 graphical interface 1480. The disk/memory storage 1450 includes a database 1420 that stores various hot zone background/template and image files 1430. The database 1420 may also include the hot zone coordinate files for both fixed 1490 and user defined hot zones. These hot zone files 1430 may be used locally or be transferred to remote users.

The database 1420 may also store files for other configurations of the hot zones 1490 for electronic whiteboard 1310, such as the time that a user must leave the pen in the hot zone 1490 for the defined function to be performed. For example, the user may be able to adjust the time from 1 to 5 seconds, according to the user's preference. The user will also have the ability to adjust the reset time. The reset time is the time it takes for a hot zone to reset. The purpose of the reset time is to ensure that the PC application is not flooded with hits on a particular hot zone. The user's adjusted times would then be stored in a configuration file in the database 1420.

The following are examples of possible files, information and data that may be involved in the communications between the communication server 1330 and the clients:

Data Point (Server to Client). The Data Point message will be used to inform client applications about the current location of the pens or erasers.

COMM Pulse Request (Client to Server). The COMM Pulse Request may be sent from the client to the server to "Ping" the server. It may be used by the client applications to check on the server to make sure it is operating correctly.

COMM Pulse Response (Server to Requesting Client). The COMM Pulse Response may be sent from the server to the client in response to a COMM Pulse Request. This packet may hold no data, but the receipt of this packet would let the client know that the server is up and running.

Hot Zone Hit (Server to Specific Client). The Hot Zone Hit is sent from the server to all of the clients that are attached to the server and are watching a specific hot zone.

Hot Zone Update (Client to Server). This allows the client to update a hot zone. The client may have the ability to change a hot zones location, its function, its timeout, its resetTime out, etc.

Hot Zone Count Request (Client to Server). The client can request the number of hot zones that are currently being watched.

Hot Zone Count Response (Server to Client). This is the response to the HZ Count request. It will contain the number of hot zones currently being watched.

Hot Zone Info Request (Client to Server). Enables the client to get the current configuration for a specific hot zone.

Hot Zone Info Response (Server to Client). The response to the Info Request. The Response will contain information about the specific hot zone requested.

There also may be a variety of INI transactions, including:

INI Request (Client to Server)

INI Response (Server to Client)

INI Set Request (Client to Server)

INI Set Response (Server to Client)

In addition, the following is an exemplary list of specialized packets that may be used for controlling the electronic whiteboard 1310 and Server/Client interactions:

DMB Request Packet (Server to DMB)

DMB Request Packet (Client to Server)

Status Connection Packet (Client to Server)

Status Connection Packet (Server to Client)

The above listing is by no means exhaustive. As may be appreciated by those skilled in the art, a variety of information, data, and files may be transferred between the communication server 1330 and the local or remote clients, as well as between transferred between the communication server 1330 and the electronic whiteboard 1310, within the scope of the invention.

Figure 15:
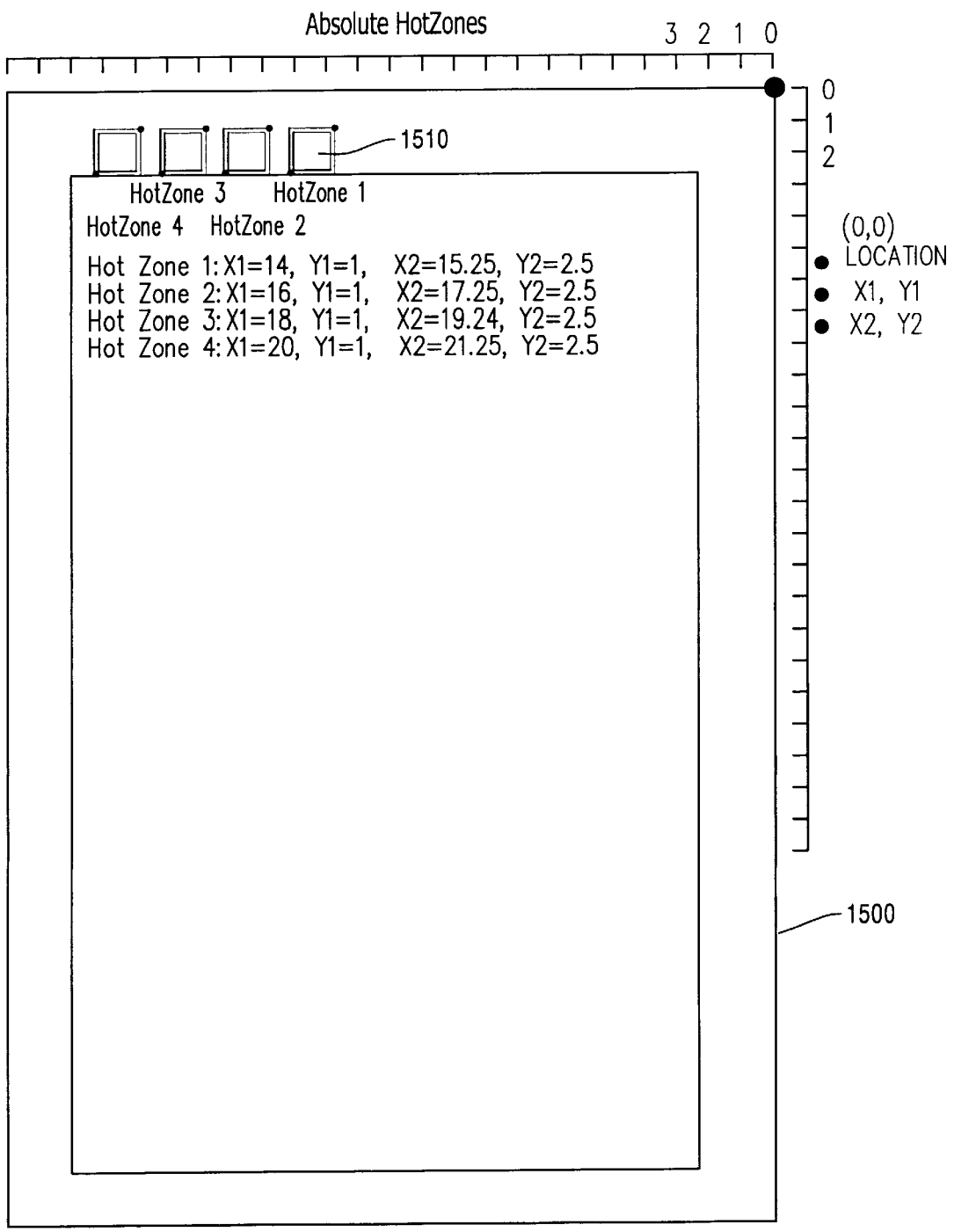
FIG. 15 is a diagram describing the absolute hot zones and how they are defined on the electronic whiteboard.

FIG. 15 is a diagram describing the absolute hot zones and how they are defined on the electronic whiteboard 1310. The absolute hot zones 1510 are defined on a template 1500 by predetermined coordinates, which in this examples are listed as:

Hot zone 1: $X1=14$, $Y1=1$, $X2=15.25$, $Y2=2.5$

Hot zone 2: $X1=16$, $Y1=1$, $X2=17.25$, $Y2=2.5$

Hot zone 3: $X1=18$, $Y1=1$, $X2=19.24$, $Y2=2.5$

Hot zone 4: $X1=20$, $Y1=1$, $X2=21.25$, $Y2=2.5$

These hot zone coordinates are forwarded to the communication server 1330 so that these areas may be monitored. The hot zones 1510 defined in this exemplary embodiment, include "Print", "Clear", "Save & Clear" and "Save". Thus, if a user wants to save the image on the electronic whiteboard 1310, the user would place the electronic pen in the predefined hot zone for Save 1510, for a predetermined time, for example two seconds. The communication server 1330 would detect the presence of the pen in the hot zone 1510 for at least the predetermined period and would send a signal to the PC to save the electronic whiteboard 1500 image. If remote users are linked up, the hot zone 1510 may be configured to also save the image in the remote user's system at the same time as it is saved locally, or exclusively to the remote user's system through a selective save function, for example.

While the absolute hot zones 1510 may be fixed, they may also be modified so that a user may locate the hot zones 1510 in other areas along the perimeter of the board by changing the hot zone coordinates. In this case, the communication server 1330 would then monitor the updated or changed hot zone areas 1510 for any electronic pen activity.

Figure 16:
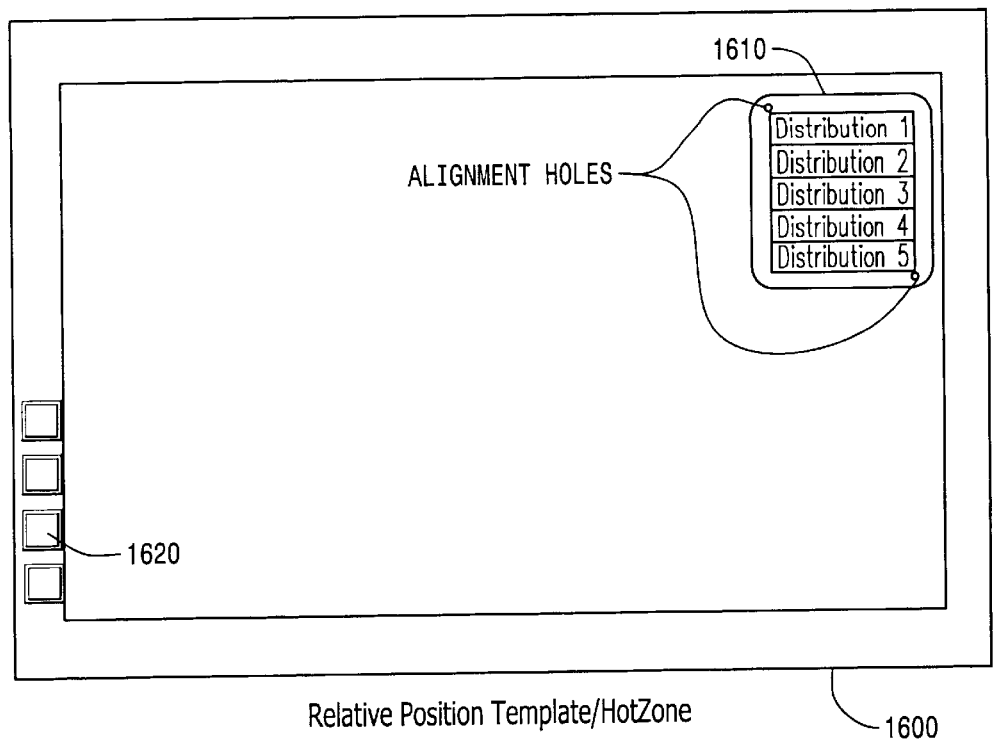
FIG. 16 is a diagram of another embodiment of the electronic whiteboard that uses relative hot zones.
Figure 16:
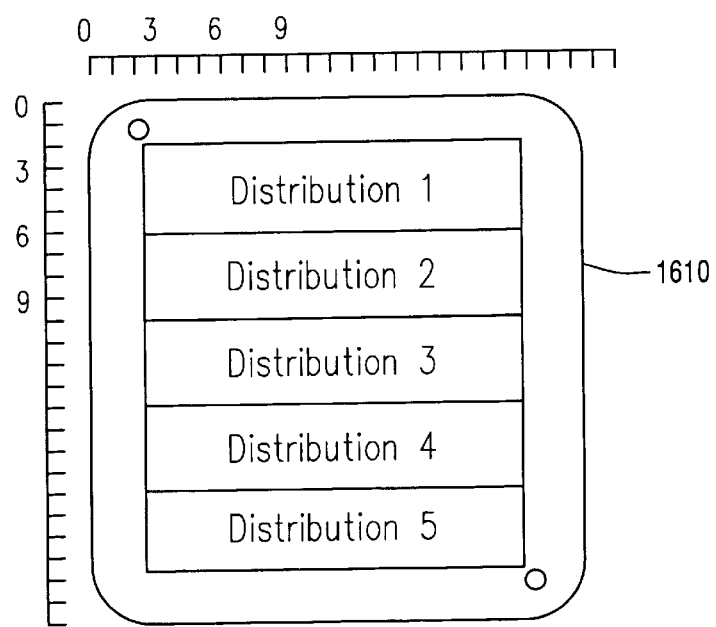

FIG. 16 is a diagram of another electronic whiteboard 1600 that describes relative hot zones 1610. Relative hot zones 1610 are hot zones that the user defines for any particular application which may be user-specific, meeting-specific, etc. In one possible embodiment, the user may have a template that may be placed on the electronic whiteboard. The user may be prompted to place the electronic pen in alignment holes at the users desired location for the hot zone 1610. Once the relative hot zone area is defined, the user may define the functions of the hot zone 1610 as well as any sub-functions in sub-areas within the hot zone 1610.

In particular, in the example shown in FIG. 16, a distribution list is depicted. In this instance, the user may define five remote users which may be selected during the image presentation and sent various images of the presentation. The five remote users may also be linked to "tasking" software in which various users may be sent or assigned various tasks relating to the image or images displayed.

Furthermore, the hot zone may also be linked to scheduling software so that the electronic whiteboard 1310 user may have items added onto an electronic calendar of a remote user with electronic whiteboard 1310 image attachments.

Many other particular applications to business meetings may be envisioned within the scope of the invention. Accordingly, the user may send a particular images with tasks and/or future meeting dates to another individual with added messages, etc. in another location via e-mail through the Internet. The invention may also capture and send audio or video files to remote users along with the electronic whiteboard 1310 images.

As discussed above, the assigned hot zone function may be local and/or remote. In particular, the hot zone function may be, as depicted in FIG. 15, as locally printing or saving the contents of the electronic whiteboard 1310. This would be an example of a "private" mode, wherein all of the hot zone functions pertain to the user's local PC environment.

However, if properly configured, the hot zone functions to be performed may be applied to all remote PCs or other electronic devices, in a "public" mode. For example, the selected hot zone function may be performed for all PCs or PDAs linked by the electronic whiteboard 1310 user through a network as soon as the communication server 1330 detects the electronic pen in the hot zone.

Figure 17:
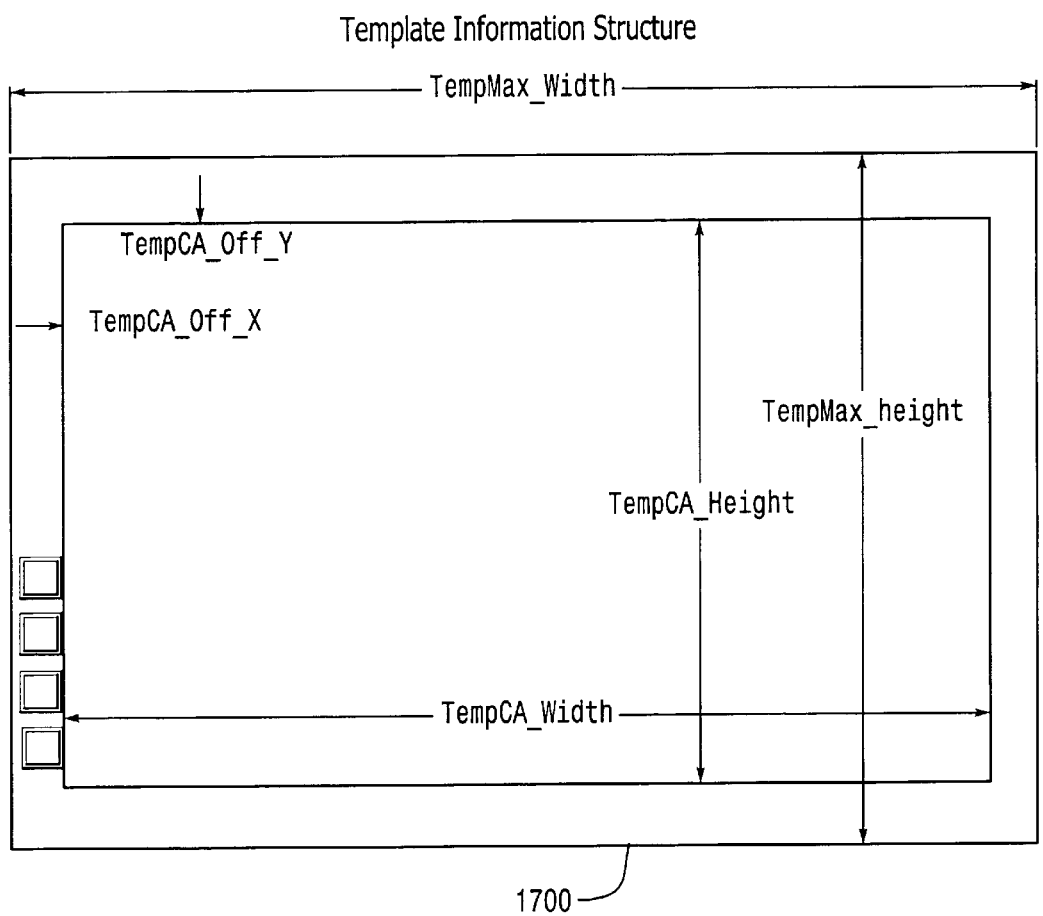
FIG. 17 is an exemplary diagram of a hot zone template.

FIG. 17 is an exemplary diagram of a template 1700. As shown in the diagram, the user may be able to alter the size and shape of the template so that either the absolute or relative areas may be viewed as a split screen, partial screen, etc. This template 1700, along with its configuration files, may be sent to remote users for calibration/alignment purposes, so that when the electronic whiteboard 1310 user wants to print at the remote user's site, the "print" hot zones are properly aligned. Therefore, when the electronic whiteboard user places the electronic pen in the "print" hot zone, for example, the remote user's print button is also activated so that printing occurs at the remote site.

Figure 18:
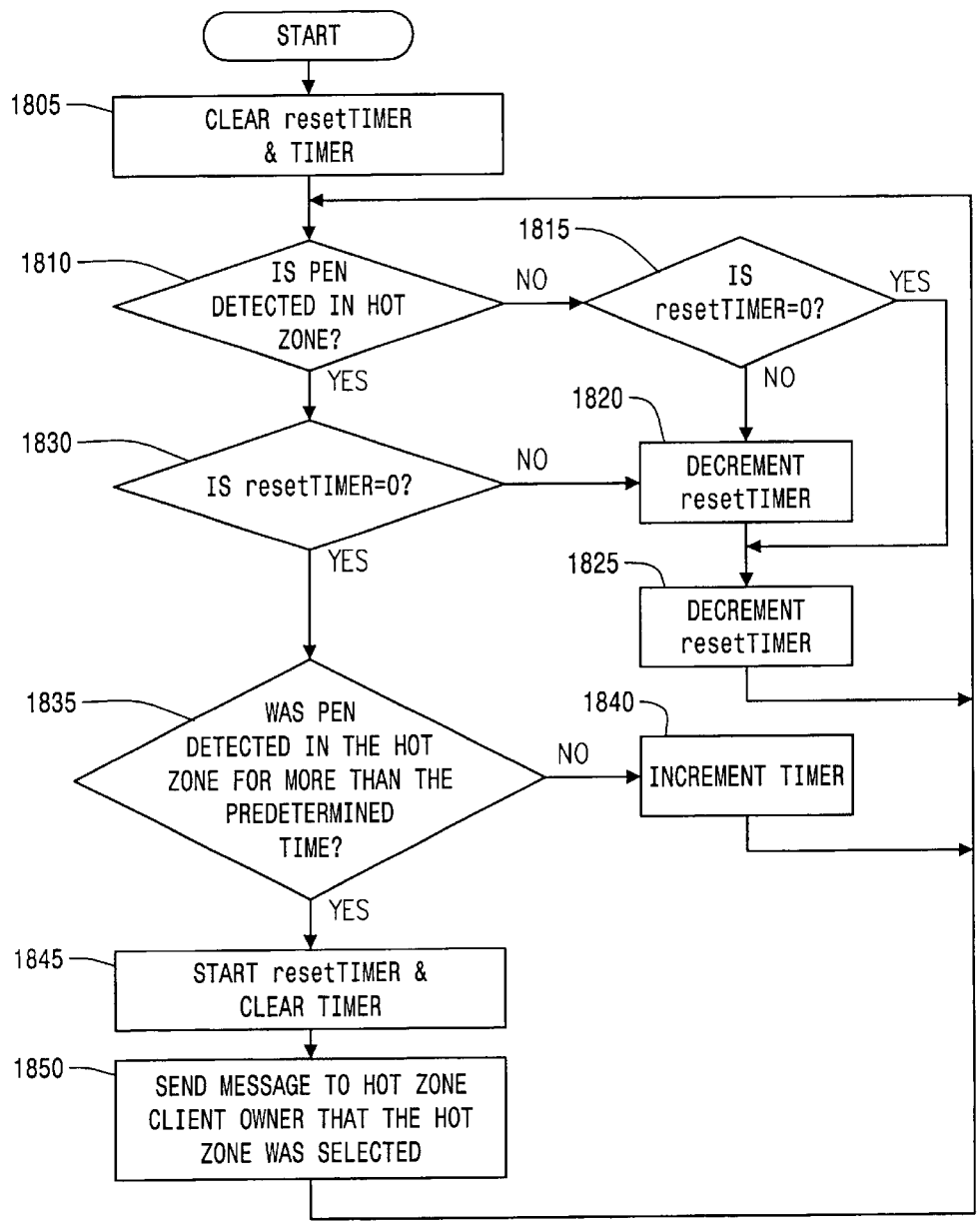
FIG. 18 is an exemplary flowchart describing the process in which a hot zone is activated.

FIG. 18 is an exemplary flowchart describing the process in which the defined hot zones on the electronic blackboard 1310 are monitored and activated. The process begins in step 1805 with the communication server 1330 clearing the resetTimer and timer. The "timer" is the value that is used to determine how long a pen has been in a particular hot zone. The "resetTimer" is used as a mechanism to ensure that the user does not receive false hits on a hot zone once it has been selected.

In this regard, in step 1810, the communication server 1330 determines whether the electronic pen has been detected in one or more of the hot zones. If the pen is not detected, in step 1815, the communication server 1330 determines whether the resetTimer=0. If the resetTimer=0, the process skips down to step 1825 where the timer is cleared and the process returns to step 1810 to continue monitoring the hot zones.

However, if the resetTimer does not equal zero, in step 1820, the reset timer value is decremented, the timer is cleared in step 1820, and the process returns to step 15 1810 to continue monitoring the hot zones.

If, in step 1810, the electronic pen is detected in one of the hot zones, the communication server 1330 determines whether resetTimer=0. If resetTimer does not equal zero, in step 1820, the resetTimer value is decremented, the timer value is cleared in step 1825 and the process returns to step 1810 to continue monitoring the hot zones.

If, in step 1830, the communication server 1330 determines that the resetTimer=0, in step 1835, the communication server 1330 whether the pen has remained in the hot zone for a predetermined period of time, such as perhaps two seconds. If the communication server 1330 determines that the pen has not remained in the hot zone for the predetermined period of time, i.e., the pen just brushed through the hot zone, for example, then the communication server 1330 increments the timer value and returns to step 1810 to continue monitoring the hot zones.

However, if in step 1835 the communication server 1330 detects the pen in the hot zone for more than the predetermined time period, the process advances to step 1845 whereby the resetTimer is started and the timer value is cleared. Then, in step 1850, the communication server 1330 sends a message to the hotzone client owner that the hot zone was selected so that the assigned hot zone function may be performed. The process then returns to step 1810 to continue monitoring the hot zones.

It is to be noted that in the above exemplary flowchart, that the timer value is cleared if resetTimer is not equal to 0 or the pen is no longer detected in the hot zone. These measures ensure that the user will not be given false detections on unintended or brief hot zone hits. Thus, the above measures require the user to keep the pen in the hot zone until the hot zone time duration is satisfied.

Figure 19:
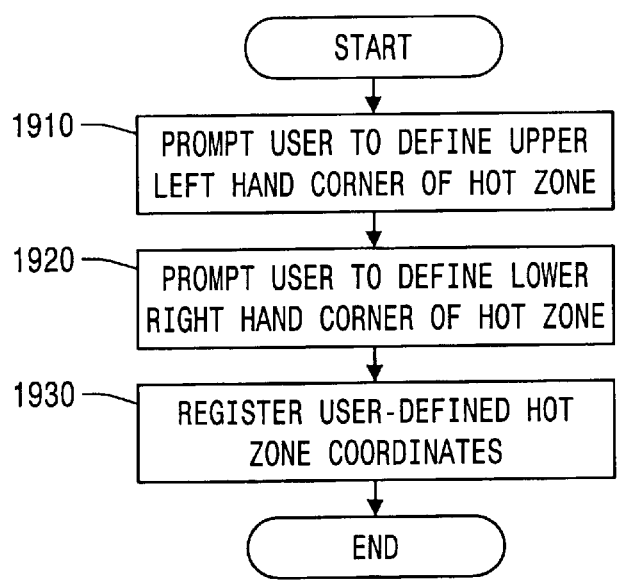
FIG. 19 is an exemplary flowchart describing the alignment process for the relative hot zones.

FIG. 19 is an exemplary flowchart describing the alignment process for the relative hot zones. The process begins and at step 1910, the user is prompted to enter the pen in the upper left-hand corner of where the hot zone should be defined. This could be done, for example, using a template which is held against the board.

Once the communication server 1330 has recognized the coordinates of the left-hand corner of the hot zone, the user is given an indication that the coordinates have been registered, through for example, a visual or audio indication, such as a beep. Then, in step 1920, the user is prompted to place the pen in the desired right-hand corner of the hot zone. Again, the user is given an indication that the coordinates of the right-hand corner have been registered.

Alternatively, the user may be given a signal that the entered points were not properly registered, and thus, requiring the user to repeat all or part of the alignment process an additional time.

In step 1930, the communication server 1330 registers the defined hot zone and begins monitoring. As discussed above, sub-hot zones may be defined and/or registered. These zones may be predefined within the user defined hot zone or may also be user defined. For example, in FIG. 16, a distribution list is shown as an exemplary use of the relative hot zones. In this regard, the user can define several individuals that may receive one or more of the electronic whiteboard 1310 images. In this regard, the user may have designated all of the people on the distribution list to receive all of the images, or may choose on an image-by-image basis, which users on the distribution list are to receive which images.

While the invention has been described with reference to the embodiments, it is to be understood that the invention is not restricted to the particular forms shown in the foregoing embodiments. Various modifications and alternations can be made thereto without departing from the scope of the invention.

For example, the invention should not be limited to exclusively electronic whiteboards. In fact, the use of hot zones according to the invention may be applied to any display device that uses a graphical user interface (GUI) and an electronic pen or stylus.

What is claimed is:

1. A communications system, comprising:
   an electronic whiteboard that communicates with an electronic pen, the electronic whiteboard coupled to a local processor and operated by a user;
   at least one hot zone defined on the electronic whiteboard, each hot zone representing a particular function to be performed; and
   a communication server connected to the local processor and one or more remote processors through a network, the communication server monitoring the hot zones such that if the communication server detects the presence of the electronic pen in one of the hot zones for at least a predetermined time, the communication server signals the local processor and the remote processor for the remote processor to perform the particular function assigned to the hot zone.

2. The communications system of claim 1, wherein at least one of the hot zones have functions and locations that are predetermined and fixed on the electronic whiteboard.

3. The communications system of claim 1, wherein at least one of the hot zones have functions and locations on the electronic whiteboard that are determined by the user.

4. The communications system of claim 3, wherein the user uses the electronic pen to define the hot zone area on the electronic whiteboard.

5. The communications system of claim 1, wherein at least one of the hot zones contains sub-hot zones with sub-functions and sub-locations within the hot zone.

6. The communications system of claim 5, wherein the sub-functions and sub-locations of the sub-hot zones may be defined by the user.

7. The communications system of claim 1, wherein at least one of the hot zones define functions are targeted to one or more specific remote user.

8. The communications system of claim 1, wherein at least one of the hot zones define functions that are targeted to all remote users.

9. The communications system of claim 1, wherein the hot zones define personal computer functions.

10. The communications system of claim 9, wherein the personal computer functions are at least one of save, clear and save, clear, and print.

11. The communications system of claim 1, wherein the hot zones define e-mail functions.

12. The communications system of claim 1, wherein the predetermined time is determined by the user.

13. The communications system of claim 1, wherein remote users can activate and deactivate the hot zones.

14. A method of operating a communications system, that includes an electronic whiteboard that communicates to an electronic pen, the electronic whiteboard coupled to a local processor and operated by a user, and a communication server connected to the local processor and one or more remote processors through a network, the method comprising:
   defining at least one hot zone on the electronic whiteboard, each hot zone representing a particular function to be performed; and
   monitoring the hot zones such that if the communication server detects the presence of the electronic pen in one of the hot zones for at least a predetermined time, the communication server signals the local processor and the remote processor for the remote processor to perform the particular function assigned to the hot zone.

15. The method of claim 14, wherein at least one of the hot zones have functions and locations that are predetermined and fixed on the electronic whiteboard.

16. The method of claim 14, wherein at least one of the hot zones have functions and locations on the electronic whiteboard that are determined by the user.

17. The method of claim 16, wherein the user uses the electronic pen to define the hot zone area on the electronic whiteboard.

18. The method of claim 14, wherein at least one of the hot zones contains sub-hot zones with sub-functions and sub-locations within the hot zone.

19. The method of claim 18, wherein the sub-functions and sub-locations of the sub-hot zones may be defined by the user.

20. The method of claim 14, wherein at least one of the hot zones define functions are targeted to one or more specific remote user.

21. The method of claim 14, wherein at least one of the hot zones define functions that are targeted to all remote users.

22. The method of claim 14, wherein the hot zones define personal computer functions.

23. The method of claim 22, wherein the personal computer functions are at least one of save, clear and save, clear, and print.

24. The method of claim 14, wherein the hot zones define e-mail functions.

25. The method of claim 14, wherein the predetermined time is determined by the user.

26. The method of claim 14, wherein remote users can activate and deactivate the hot zones.

* * * * *